(12) United States Patent
Mu

(10) Patent No.: US 12,119,943 B2
(45) Date of Patent: Oct. 15, 2024

(54) METHOD AND APPARATUS FOR HARQ FEEDBACK

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 391 days.

(21) Appl. No.: 17/634,661

(22) PCT Filed: Aug. 13, 2019

(86) PCT No.: PCT/CN2019/100456
§ 371 (c)(1),
(2) Date: Feb. 11, 2022

(87) PCT Pub. No.: WO2021/026787
PCT Pub. Date: Feb. 18, 2021

(65) Prior Publication Data
US 2022/0416954 A1    Dec. 29, 2022

(51) Int. Cl.
| | | |
|---|---|---|
| H04L 1/00 | (2006.01) | |
| H04L 1/1829 | (2023.01) | |
| H04W 74/0833 | (2024.01) | |
| H04L 1/1812 | (2023.01) | |

(52) U.S. Cl.
CPC .......... *H04L 1/1854* (2013.01); *H04L 1/1861* (2013.01); *H04L 1/1864* (2013.01); *H04W 74/085* (2013.01); *H04L 1/1812* (2013.01)

(58) Field of Classification Search
CPC ... H04L 1/1854; H04L 1/1861; H04W 74/085
USPC .......................................................... 370/329
See application file for complete search history.

(56) References Cited

U.S. PATENT DOCUMENTS

| | | | |
|---|---|---|---|
| 11,387,948 B2* | 7/2022 | Liu | H04L 5/0082 |
| 11,758,481 B2* | 9/2023 | Ding | H04W 52/0235 370/311 |
| 2016/0219626 A1* | 7/2016 | Martin | H04W 28/0221 |
| 2021/0100004 A1* | 4/2021 | Yang | H04W 72/21 |
| 2022/0386244 A1* | 12/2022 | Lei | H04L 1/1825 |

(Continued)

FOREIGN PATENT DOCUMENTS

WO    WO-2021062871 A1 *    4/2021    ........... H04L 1/1812

OTHER PUBLICATIONS

Nokia et al. "On 2-Step RACH Procedure", 3GPP TSG RAN WG1 #96bis R1-1904716, Apr. 12, 2019, Xi/an China, pp. 1-16.

(Continued)

*Primary Examiner* — Anthony Mejia
(74) *Attorney, Agent, or Firm* — Cozen O'Connor

(57) ABSTRACT

A method and apparatus for HARQ feedback includes, after receiving a first random access message Msg.A sent by each of at least one terminal, a base station returning a second random access message Msg.B to the at least one terminal. The Msg.B is configured to indicate respective feedback parameters of HARQ feedback terminals in the at least one terminal, and respective HARQ feedback resources of the HARQ feedback terminals are different. The base station receives, on the respective HARQ feedback resources of retransmission terminals, HARQ feedback sent for the Msg.B by the retransmission terminals respectively.

14 Claims, 8 Drawing Sheets

(56) References Cited

U.S. PATENT DOCUMENTS

2022/0416954 A1* 12/2022 Mu ...................... H04L 5/0055
2024/0214125 A1*  6/2024 Zeng .................... H04L 1/1861

OTHER PUBLICATIONS

PCT/CN2019/100456 International Search Report, dated Apr. 28, 2021, 2 pages.

* cited by examiner

METHOD AND APPARATUS FOR HARQ FEEDBACK

CROSS-REFERENCE TO RELATED APPLICATION

This application is the US national phase application of International Application No. PCT/CN2019/100456, filed on Aug. 13, 2019, the entire contents of which are incorporated herein by reference.

TECHNICAL FIELD

The disclosure relates to the field of wireless communication technology, in particular to a method and apparatus for hybrid automatic repeat request (HARQ) feedback and a readable storage medium.

BACKGROUND

With the development of wireless communication technology, users have high requirements for wireless communication, which promotes continuous evolution of the wireless communication technology to the fifth-generation mobile communication (5G) network.

In the related art, with the support of 5G New Radio (NR), the third generation partnership project (3GPP) has carried out a two-step random access standardization, and proposed a two-step random access mechanism. According to the mechanism, a terminal sends a first random access message Msg.A to a base station, and the base station returns a second random access message Msg.B to the terminal in response to the Msg.A sent by the terminal, to complete random access between the terminal and the base station. For the proposed two-step random access process, after the terminal receives the Msg.B returned by the base station, there is not a good solution for performing HARQ feedback by the terminal to the base station.

SUMMARY

According to a first aspect of the disclosure, a method for HARQ feedback, performed by a base station, is provided. The method includes:
  returning a second random access message Msg.B to at least one terminal after receiving a first random access message Msg.A sent by each of the at least one terminal, in which the Msg.B is configured to indicate a HARQ feedback resource of each HARQ feedback terminal in the at least one terminal, and the HARQ feedback resources of respective HARQ feedback terminals are different; and receiving a HARQ feedback sent by each HARQ feedback terminal for the Msg.B on the HARQ feedback resource of each HARQ feedback terminal.

According to a second aspect of the disclosure, a method for HARQ feedback, performed by a target terminal, is provided. The method includes:
  sending a first random access message Msg.A to a base station;
  receiving a second random access message Msg.B returned by the base station, in which the Msg.B is configured to indicate a HARQ feedback resource of each HARQ feedback terminal in at least one terminal, and the HARQ feedback resources of respective HARQ feedback terminals are different; and
  sending a HARQ feedback to the base station in response to that the target terminal is any one of the respective HARQ feedback terminals.

According to a third aspect of the disclosure, an apparatus for HARQ feedback, performed by a base station, is provided. The apparatus includes: a processor and a memory configured to store instructions executable by the processor. The processor is configured to: return a second random access message Msg.B to at least one terminal after receiving a first random access message Msg.A sent by each of the at least one terminal, in which the Msg.B is configured to indicate a HARQ feedback resource of each HARQ feedback terminal in the at least one terminal, and the HARQ feedback resources of respective HARQ feedback terminals are different; and receive a HARQ feedback sent by each HARQ feedback terminal for the Msg.B on the HARQ feedback resource of each HARQ feedback terminal.

According to a fourth aspect of the disclosure, an apparatus for HARQ feedback, performed by a base station, is provided. The apparatus includes: a processor and a memory configured to store instructions executable by the processor. The processor is configured to: send a first random access message Msg.A to a base station; receive a second random access message Msg.B returned by the base station, in which the Msg.B is configured to indicate a HARQ feedback resource of each HARQ feedback terminal in at least one terminal, and the HARQ feedback resources of respective HARQ feedback terminals are different; and send a HARQ feedback to the base station in response to that the target terminal is any one of the HARQ feedback terminals.

According to a fifth aspect of the disclosure, a computer-readable storage medium is provided. The computer-readable storage medium includes executable instructions, and when a processor in a base station calls the executable instructions, the method for HARQ feedback according to the first aspect is implemented.

According to a sixth aspect of the disclosure, a computer-readable storage medium is provided. The computer-readable storage medium includes executable instructions, and when a processor in a terminal calls the executable instructions, the method for HARQ feedback according to the second aspect is implemented.

It should be understood that the above general description and the following detailed description are only exemplary and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

It should be understood that "several" mentioned in the disclosure refers to one or more, and "plurality" refers to two or more. The term "and/or" describes the association relationship of the associated objects, indicating that there can be three types of relationships, for example, A and/or B, which means that A exists alone, A and B exist at the same time, and B exists alone. The character "/" generally indicates that the associated objects before and after are in an "or" relationship. To facilitate understanding, some application scenarios involved in the disclosure will be briefly introduced below.

Figure 1:
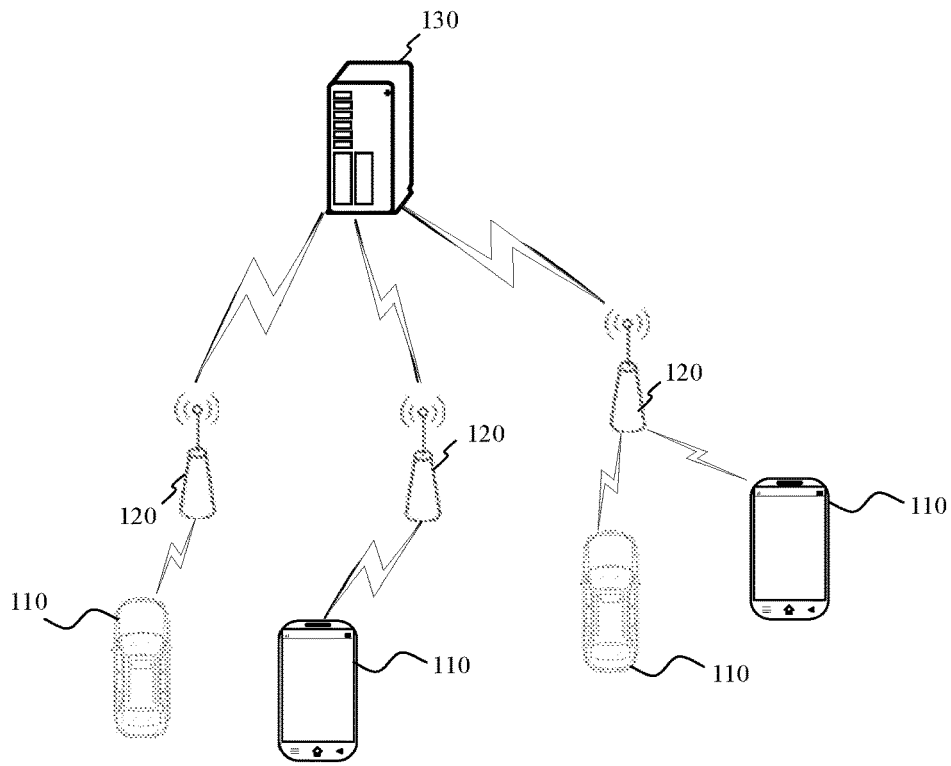
FIG. 1 is a schematic diagram of a wireless communication system according to an embodiment of the disclosure.

FIG. 1 is a schematic diagram of a wireless communication system according to an embodiment of the disclosure. As shown in FIG. 1, the wireless communication system is a communication system based on cellular mobile communication technology. The wireless communication system may include several terminals 110 and base stations 120. The terminal 110 may be a device that provides voice and/or data connectivity to the user. The terminal 110 can communicate with one or more core networks via a radio access network (RAN). The terminal 110 may be an IoT terminal, such as a sensor device, a mobile phone (or a cellular phone), and a computer with the IoT terminal, for example, a fixed, portable, pocket-sized, handheld, built-in computer or vehicle-mounted device, such as, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 110 may also be a device of an unmanned aerial vehicle, an in-vehicle device, or the like.

The base station 120 may be a network side device in a wireless communication system. The wireless communication system may also be a 5G system, also known as the new radio (NR) system. Alternatively, the wireless communication system may also be a next-generation system of the 5G system.

Optionally, the base station 120 may also be a base station (gNB) adopting a centralized and distributed architecture in the 5G system. When the base station 120 adopts the centralized and distributed architecture, it generally includes a central unit (CU) and at least two distributed units (DUs). The CU is provided with protocol stacks of a packet data convergence protocol (PDCP) layer, a radio link control (RLC) layer, and a media access control (MAC) layer. The DU is provided with a protocol stack of a physical (PHY) layer. The specific implementation of the base station 120 is not limited in embodiments of the disclosure.

A wireless connection may be established between the base station 120 and the terminal 110 through a wireless air interface. In different embodiments, the wireless air interface is a wireless air interface based on the fifth-generation mobile communication network technology (5G) standard, for example, the wireless air interface is a NR; or, the wireless air interface may be a wireless air interface based on 5G-based next-generation mobile communication network technology standard.

Optionally, the wireless communication system may further include a network management device 130.

The base stations 120 may be connected to the network management device 130 respectively. The network management device 130 may be a core network device in a wireless communication system. The network management device 130 may be a mobility management entity (MME) of an evolved packet core (EPC). Alternatively, the network management device may also be other core network devices, such as a serving gateway (SGW), a public data network gateway (PGW), and a policy and charging rules function (PCRF) unit or a home subscriber server (HSS). The implementation form of the network management device 130 is not limited in the embodiments of the disclosure.

Figure 2:
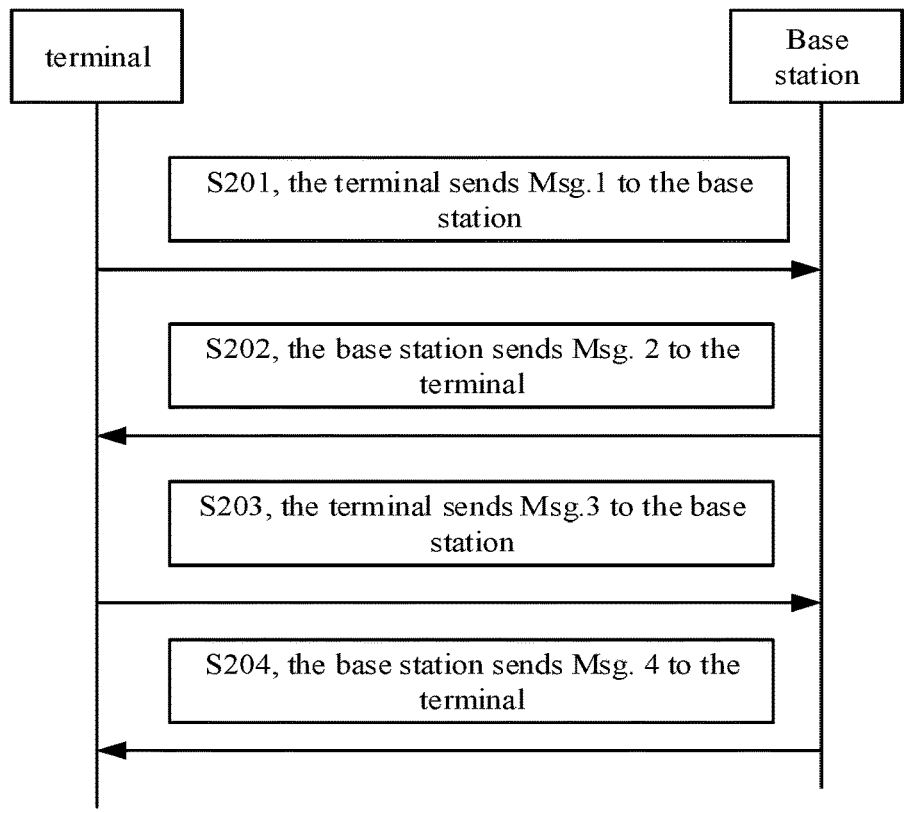
FIG. 2 is a flowchart of a four-step random access according to an embodiment of the disclosure.

Optionally, in the above wireless communication system, the terminal 110 may initiate a contention-based random access to the base station 120. FIG. 2 is a flowchart of a four-step random access according to an embodiment of the disclosure. As shown in FIG. 2, the relevant steps of the four-step random access may include the following steps.

In step 201, the terminal sends Msg.1: random access preamble sequence (Preamble) to the base station.

The terminal sends the Preamble to the base station, and the base station estimates the transmission delay of the terminal based on the Preamble to achieve uplink synchronization.

In step 202, the base station sends Msg.2: random access response (RAR) to the terminal.

The base station sends a timing advance command based on the transmission delay estimated in the first step above to adjust a sending time of the terminal. The Msg.2 is organized by the media access control (MAC) layer of the base station and carried by the down link share channel (DL_SCH). One Msg.2 can respond to random access requests from a plurality of terminals at the same time.

The base station uses a PDCCH to schedule the Msg.2 and addresses (i.e., scramble) through C-RNTI or RA-RNTI. RA-RNTI is determined by a time-frequency resource location of a physical random access channel (PRACH) that carries Msg.1. The Msg.2 includes the uplink transmission timing advance value and allocates uplink resources and temporary C-RNTI for the Msg.3.

In step 203, the terminal sends the Msg.3 to the base station, which is the first scheduled transmission.

After receiving the Msg. 2, the terminal transmits the Msg. 3 on the allocated uplink resources, and sends User Equipment Identify (UE ID) to the base station through the PUSCH.

Optionally, the Msg. 3 includes a common control channel (CCCH) service data unit (SDU), which is used for a Msg. 4 to carry a contention resolution ID.

In step 204, the base station sends the Msg. 4—contention resolution message to the terminal.

The contention resolution message is sent by the base station to the terminal on the PDSCH.

Figure 3:
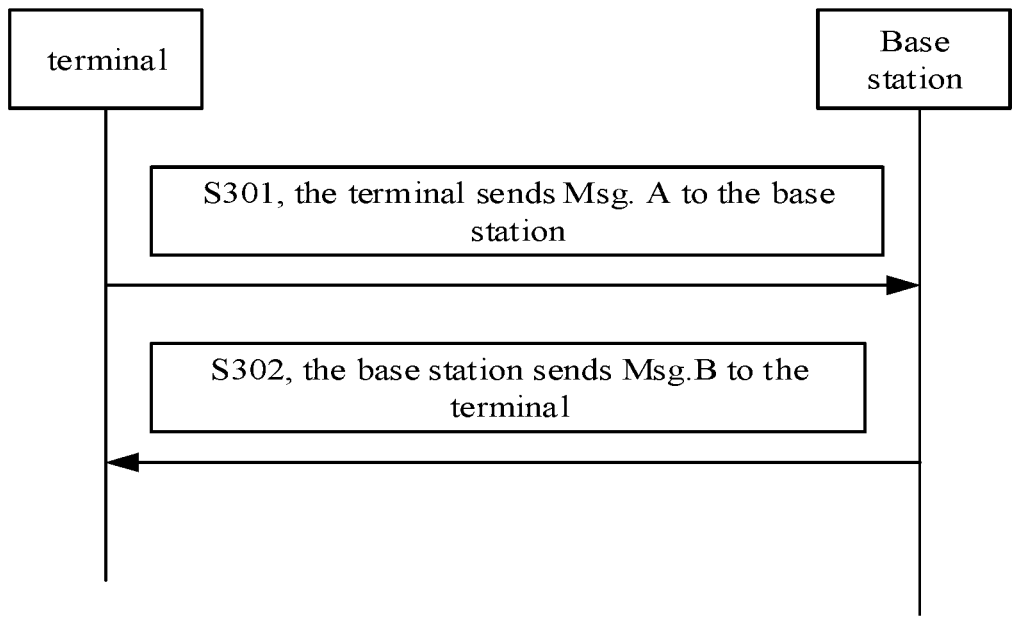
FIG. 3 is a flowchart of a two-step random access according to the disclosure.

In order to shorten the time delay of the random access process and to improve the random access efficiency of the terminal, 3GPP proposed a two-step random access mechanism in release 16, that is, a two-step random access. FIG. 3 is a flowchart of a two-step random access according to the disclosure. As shown in FIG. 3, the related steps of the two-step random access may include the following steps.

In step 301, the terminal sends the Msg. A to the base station.

Optionally, the Msg.A includes the content of the Msg.1 and the Msg.3, that is, the Msg.A includes: a random access preamble sequence and a UE ID. The UE ID may be one of C-RNTI, temporary C-RNTI, and RA-RNTI.

Optionally, step 301 may consist of step 301a and step 301b.

In step 301a, the terminal may send the selected Preamble on the PRACH resource, and at the same time, the base station will detect the Preamble on the corresponding PRACH.

In step 301b, the terminal may also transmit payload information on the PUSCH resource, in which the payload information includes equivalent information of the Msg.3, such as UE ID and partial user data.

When the base station detects the Preamble in step 301a, the base station will receive the payload information sent by the terminal on the corresponding PUSCH resource.

In step 302, the base station sends the Msg.B to the terminal.

That is, when the base station successfully receives the Preamble or payload information in the Msg.A, the base station can send the Msg.B to the terminal. Optionally, the Msg.B includes the content of the Msg. 2 and the Msg. 4, that is, the Msg.B includes: the random access response and contention resolution information. Correspondingly, the transmission mode of the Msg.B correspond to the PDCCH and the PDSCH mode.

For the above two-step random access process, in order to improve the reliability of the transmission of the Msg.B between the terminal and the base station, it is proposed that the terminal side needs to perform HARQ feedback on the reception condition of the Msg.B.

In the related art, for the NR system, in the HARQ feedback scheme for the terminal, the terminal can calculate the HARQ feedback resource according to the end time of the received data, and perform feedback on the calculated feedback resource. For example, when the terminal can perform the HARQ feedback on the received data in the PDCCH that indicates semi-persistent scheduling (SPS), the terminal can obtain the end time when the data is received, and shift the end time by the time offset m, to obtain the HARQ feedback time. The time offset m may be indicated in the downlink control information (DCI) sent by the base station. Optionally, the base station can configure a time interval set for the DCI through a high-level signaling, and the DCI may indicate the terminal to use a value in the time interval set as the time offset m used to calculate the HARQ feedback time of this retransmission.

Optionally, when the terminal performs the HARQ feedback at the calculated HARQ time, it also needs to determine which PUCCH resource within the time to use to transmit the HARQ. That is, the terminal also needs to determine the specific PUCCH resource. In a possible implementation, the manner for the terminal to determine the PUCCH resource may be as follows. The high-layer signaling can configure a PUCCH resource set for the terminal in advance, and each PUCCH in the set has a unique serial number. When the number of PUCCH resources in the PUCCH resource set configured by the high-layer signaling for the terminal is less than or equal to 8, the serial number of each PUCCH can be directly indicated by 3-bit information field in the DCI. For example, 001 may indicate a PUCCH serial number in the PUCCH resource, and the terminal may obtain the corresponding PUCCH resource according to 001 indicated by the information field in the DCI. When the number of PUCCH resources in the PUCCH resource set configured by the high-layer signaling for the terminal is greater than 8, the terminal can calculate a serial number of the used PUCCH resource by a derivation formula, based on the smallest control channel element (CCE) number of the control field where the PUCCH resource set is located and the indication value of the 3-bit information field. Optionally, the derivation formula may be as follows:

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases};$$

$r_{PUCCH}$ is the serial number of the PUCCH resource obtained by calculation, $R_{PUCCH}$ is the number of PUCCH resources in the PUCCH resource set configured for the terminal by the high-level signaling, $N_{CCE,p}$ is a total number of CCEs owned by the control field where the PDCCH is located, $n_{CCE,p}$ is the smallest CCE number among the CCEs owned by the control field where the PDCCH is located, $\Delta_{PRI}$ is the indication value of the 3-bit information field in the DCI, and $R_{PUCCH} \bmod 8$ corresponds to a remainder of the $R_{PUCCH}$ divided by 8. Optionally, when the terminal may perform the HARQ feedback on the data in the PDSCH received by itself, which may also be performed referring to the foregoing manner.

When the above solution is applied to the terminal to perform the HARQ feedback on the reception condition of the Msg.B, the data received by the terminal is the Msg.B. However, when the terminal performs random access, the RRC connection between the terminal and the base station is not established. The PUCCH resource set to be selected in the above scheme cannot be configured by the higher-layer signaling. In this case, the PUCCH resource set to be selected is generally broadcasted to the terminal through a system message. If a plurality of terminals initiate the two-step random access to the base station at the same time, the PDCCH used for the Msg. B returned by the base station is the same. At this time, if the indication value of the 3-bit information field indicating a plurality of terminals in the DCI is the same, then for the plurality of terminals sharing the same PUCCH resource set, the HARQ feedback resources calculated by the plurality of terminals will be the same, that is, in the above solution, when performing the HARQ feedback to the base station, there may be a problem of conflict of the PUCCH resource used by the plurality of terminals, which makes the terminal fail to perform the HARQ feedback on the Msg.B, so that the feedback efficiency of the terminal on the Msg.B is reduced.

Figure 4:
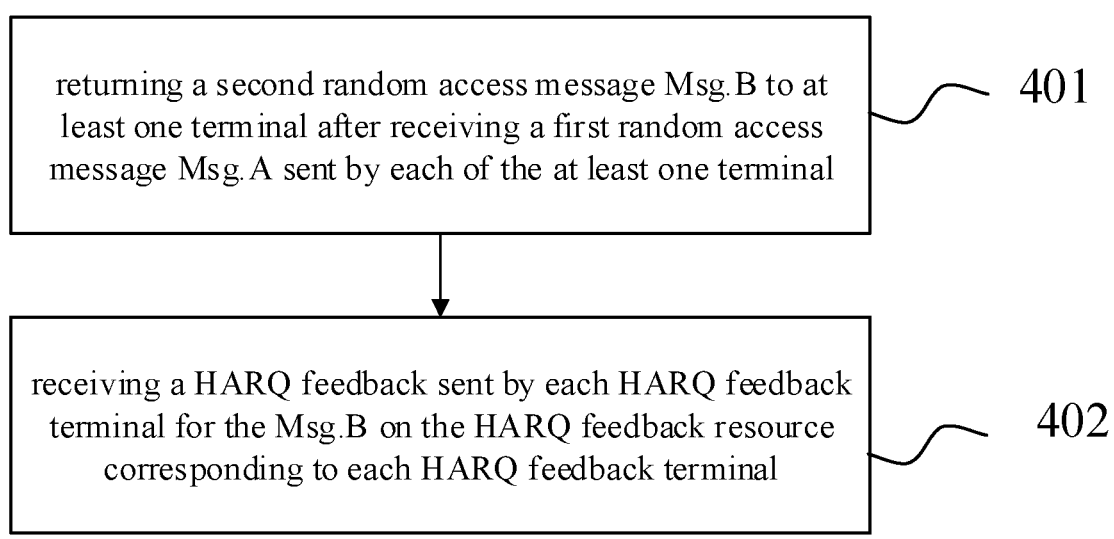
FIG. 4 is a flowchart of a method for HARQ feedback according to an embodiment of the disclosure.

In order to reduce the collision of PUCCHs used when the plurality of terminals perform the HARQ feedback, the disclosure provides a method for HARQ feedback. FIG. 4 is a flowchart of a method for HARQ feedback according to an embodiment of the disclosure. The method may be applied to the wireless communication system shown in FIG. 1 and performed by a base station in the system. As shown in FIG. 4, the method includes the following steps.

In step 401, a second random access message Msg.B is returned to at least one terminal after receiving a first random access message Msg.A sent by each of the at least one terminal.

The Msg.B is configured to indicate a HARQ feedback resource of each HARQ feedback terminal in the at least one terminal, and the HARQ feedback resources of respective HARQ feedback terminals are different.

In step 402, a HARQ feedback sent by each HARQ feedback terminal for the Msg.B is received on the HARQ feedback resource of each HARQ feedback terminal.

Optionally, returning the Msg.B to at least one terminal, includes:
  returning the Msg.B including physical uplink control channel (PUCCH) parameters of respective HARQ feedback terminals to the at least one terminal, in which the PUCCH parameters of different terminals in the respective HARQ feedback terminals are different; in which
  the PUCCH parameter includes a time parameter k and a PUCCH resource indicator $\Delta_{PRI}$; the time parameter k is configured to calculate a time point of sending the HARQ feedback, and the PUCCH resource indicator $\Delta_{PRI}$ is configured to calculate a serial number of PUCCH resources for sending the HARQ feedback in a PUCCH resource set; and the PUCCH resource set is a candidate PUCCH resource set configured by a high signaling.

Optionally, the PUCCH parameters of respective HARQ feedback terminals include a common time parameter k shared by the HARQ feedback terminals, and the PUCCH resource indicator $\Delta_{PRI}$ of each HARQ feedback terminal; or,
  the PUCCH parameters of respective HARQ feedback terminals include the time parameter k of each HARQ feedback terminal, and a common PUCCH resource indicator $\Delta_{PRI}$ shared by the HARQ feedback terminals; or,
  the PUCCH parameters of respective HARQ feedback terminals include the time parameter k of each HARQ feedback terminal, and the PUCCH resource indicator $\Delta_{PRI}$ of each HARQ feedback terminal.

Optionally, when the PUCCH parameters of each HARQ feedback terminals include the common time parameter k shared by the HARQ feedback terminals, and the PUCCH resource indicator $\Delta_{PRI}$ of each HARQ feedback terminal,
  the common time parameter k shared by the HARQ feedback terminals is carried in a physical downlink control channel (PDCCH) of the Msg.B; and
  the PUCCH resource indicator $\Delta_{PRI}$ of each HARQ feedback terminal is carried in proprietary information of each HARQ feedback terminal, and the proprietary information of each HARQ feedback terminal is carried in a physical downlink shared channel (PDSCH) of the Msg.B.

Optionally, when the PUCCH parameters of respective HARQ feedback terminals include the time parameter k of each HARQ feedback terminal, and a common PUCCH resource indicator $\Delta_{PRI}$ shared by the HARQ feedback terminals,
  the common PUCCH resource indicator $\Delta_{PRI}$ shared by the HARQ feedback terminals is carried in the PDCCH of the Msg.B; and
  the time parameter k of each HARQ feedback terminal is carried in proprietary information of each HARQ feedback terminal, and the proprietary information of each HARQ feedback terminal is carried in the PDSCH of the Msg.B.

Optionally, when the PUCCH parameters of respective HARQ feedback terminals include the time parameter k of each HARQ feedback terminal, and the PUCCH resource indicator $\Delta_{PRI}$ of each HARQ feedback terminal, the time parameter k of each HARQ feedback terminal and the PUCCH resource indicator $\Delta_{PRI}$ of each HARQ feedback terminal are carried in the proprietary information of each HARQ feedback terminal, in which the proprietary information of each HARQ feedback terminal is carried in the PDSCH of the Msg.B.

Optionally, before receiving the HARQ feedback sent by each HARQ feedback terminal for the Msg.B on the HARQ feedback resource of each HARQ feedback terminal, the method further includes:
  obtaining PUCCH resource offset information of each HARQ feedback terminal based on offset configuration information, wherein the PUCCH resource offset information is configured to indicate an offset of the PUCCH resource for sending the HARQ feedback relative to a reference PUCCH resource, the reference PUCCH resource is a PUCCH resource calculated based on the PUCCH resource indicator $\Delta_{PRI}$; and
  determining the HARQ feedback resource of each HARQ feedback terminal based on the PUCCH resource offset information of each HARQ feedback terminal.

Optionally, the offset configuration information includes PUCCH resource offset information of each random access preamble sequence, and obtaining the PUCCH resource offset information of each HARQ feedback terminal based on the offset configuration information includes: obtaining the PUCCH resource offset information of each HARQ feedback terminal by querying the offset configuration information based on a preamble sequence included in the Msg.A sent by each HARQ feedback terminal.

Optionally, the Msg.B includes the proprietary information of each of the at least one terminal, and the offset configuration information includes the PUCCH resource offset information corresponding to a location where the proprietary information is in the Msg.B; and
  obtaining the PUCCH resource offset information of each HARQ feedback terminal based on the offset configuration information includes:
  obtaining the PUCCH resource offset information of each HARQ feedback terminal by querying the offset configuration information based on a location of the proprietary information of each HARQ feedback terminal in the Msg.B.

Optionally, before returning the Msg.B to the at least one terminal, the method further includes: sending the offset configuration information through a broadcast channel.

Optionally, the Msg.A includes the random access preamble sequence and the PUSCH; and the HARQ feedback terminal is a terminal for which the base station detects the corresponding preamble sequence and successfully parses out content in the PUSCH.

Optionally, the at least one terminal further includes respective retransmission terminals, and the retransmission terminal is a terminal for which the base station detects the corresponding preamble sequence and fails to parse out content in the PUSCH, the Msg.B is further configured to indicate a retransmission resource of each retransmission terminal, and the method further includes: receiving the PUSCH in the Msg.A of each retransmission terminal that is retransmitted by each retransmission terminal on the retransmission resource of each retransmission terminal. Each retransmission terminal is any of the respective retransmission terminals.

In conclusion, after detecting the Msg.A sent by each of the at least one terminal, the base station returns the Msg.B to the at least one terminal. The Msg.B is configured to indicate the feedback parameters of respective HARQ feedback terminals in the at least one terminal. The base station receives the HARQ feedback sent by each HARQ feedback terminal for the Msg.B on the HARQ feedback resource of each HARQ feedback terminal. In the disclosure, the feedback parameters of respective HARQ feedback terminals are indicated in the Msg.B returned by the base station to the at least one terminal, and the HARQ feedback sent by each terminal that needs to perform HARQ feedback is received on different feedback resources, thereby reducing the collision of terminals that need to perform HARQ feedback using the same HARQ feedback resource, and improving the feedback efficiency of the terminal to the Msg.B.

Figure 5:
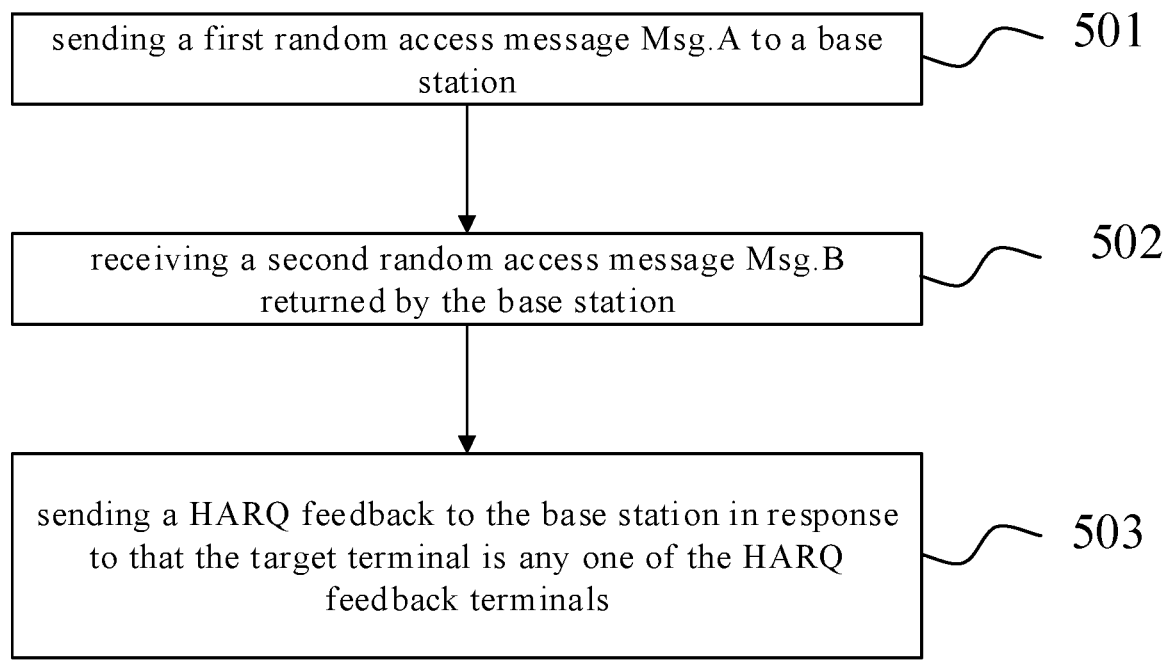
FIG. 5 is a flowchart of a method for HARQ feedback according to an embodiment of the disclosure.

FIG. 5 is a flowchart of a method for HARQ feedback according to an embodiment of the disclosure. As shown in FIG. 5, the method for HARQ feedback may be applied to the wireless communication system shown in FIG. 1, and performed by a target terminal of at least two terminals corresponding to a power saving signal sent by the base station. The method may include the following steps.

In step 501, a first random access message Msg.A is sent to a base station.

In step 502, a second random access message Msg.B returned by the base station is received.

The Msg.B is configured to indicate the HARQ feedback resource of each HARQ feedback terminal in the at least one terminal, and the HARQ feedback resources of respective HARQ feedback terminals are different.

In step 503, when the target terminal is any one of the HARQ feedback terminals, the HARQ feedback is sent to the base station.

Optionally, the Msg.B includes the PUCCH parameters of respective HARQ feedback terminals, and the PUCCH parameters of different terminals in the respective HARQ feedback terminals are different; and before sending the HARQ feedback to the base station, the method further includes:
extracting the PUCCH parameter of the target terminal from the Msg.B;
obtaining the HARQ feedback resource of the target terminal based on the PUCCH parameter of the target terminal;
in which the PUCCH parameter includes a time parameter k and a PUCCH resource indicator $\Delta_{PRI}$; the time parameter k is configured to calculate a time point of sending the HARQ feedback, and the PUCCH resource indicator $\Delta_{PRI}$ is configured to calculate a serial number of the PUCCH resource for sending the HARQ feedback in a PUCCH resource set, the PUCCH resource set is a candidate PUCCH resource set configured by a high signaling.

Optionally, the PUCCH parameters of respective HARQ feedback terminals include a common time parameter k shared by the HARQ feedback terminals, and the PUCCH resource indicator $\Delta_{PRI}$ of each HARQ feedback terminal; or, the PUCCH parameters of respective HARQ feedback terminals include the time parameter k of each HARQ feedback terminal, and a common PUCCH resource indicator $\Delta_{PRI}$ shared by the HARQ feedback terminals; or, the PUCCH parameters of respective HARQ feedback terminals include the time parameter k of each HARQ feedback terminal, and the PUCCH resource indicator $\Delta_{PRI}$ of each HARQ feedback terminal.

Optionally, when the PUCCH parameters of respective HARQ feedback terminals include the common time parameter k shared by the HARQ feedback terminals, and the PUCCH resource indicator $\Delta_{PRI}$ of each HARQ feedback terminal,
the common time parameter k shared by the HARQ feedback terminals is carried in a PDCCH of the Msg.B; and
the PUCCH resource indicator $\Delta_{PRI}$ of each HARQ feedback terminal is carried in proprietary information of each HARQ feedback terminal, and the proprietary information of each HARQ feedback terminal is carried in the PDSCH of the Msg.B.

Optionally, when the PUCCH parameters of respective HARQ feedback terminals include the time parameter k of each HARQ feedback terminal, and a common PUCCH resource indicator $\Delta_{PRI}$ shared by the HARQ feedback terminals,
the common PUCCH resource indicator $\Delta_{PRI}$ shared by the HARQ feedback terminals is carried in a PDCCH of the Msg.B; and
the time parameter k of each HARQ feedback terminal is carried in proprietary information of each HARQ feedback terminal, and the proprietary information of each HARQ feedback terminal is carried in the PDSCH of the Msg.B.

Optionally, when the PUCCH parameters of respective HARQ feedback terminals include the time parameter k of each HARQ feedback terminal, and the PUCCH resource indicator $\Delta_{PRI}$ of each HARQ feedback terminal,
the time parameter k of each HARQ feedback terminal and the PUCCH resource indicator $\Delta_{PRI}$ of each HARQ feedback terminal are carried in the proprietary information of each HARQ feedback terminal, wherein the proprietary information of each HARQ feedback terminal is carried in the PDSCH of the Msg.B.

Optionally, before sending the HARQ feedback to the base station on the HARQ feedback resource of the target terminal, the method further includes:
obtaining PUCCH resource offset information of the target terminal based on offset configuration information, in which the PUCCH resource offset information is configured to indicate an offset of the PUCCH resource for sending the HARQ feedback relative to a reference PUCCH resource, and the reference PUCCH resource is a PUCCH resource calculated based on the PUCCH resource indicator $\Delta_{PRI}$; and
determining the HARQ feedback resource of the target terminal based on the PUCCH resource offset information of the target terminal.

Optionally, the offset configuration information includes the PUCCH resource offset information of each random access preamble sequence; and
obtaining the PUCCH resource offset information of the target terminal based on the offset configuration information includes:
obtaining the PUCCH resource offset information of the target terminal by querying the offset configuration information based on the preamble sequence in the Msg.A sent by the target terminal.

Optionally, the Msg.B includes the proprietary information of each of the at least one terminal, and the offset configuration information includes the PUCCH resource offset information corresponding to a location of the proprietary information in the Msg.B; and obtaining the PUCCH resource offset information of the target terminal based on the offset configuration information, includes:

obtaining the PUCCH resource offset information of the target terminal by querying the offset configuration information based on the location of the proprietary information of the target terminal in the Msg. B.

Optionally, before sending the Msg.A to the base station, the method further includes: receiving the offset configuration information sent by the base station through the broadcast channel.

Optionally, the Msg.A includes a random access preamble sequence and a PUSCH, and the HARQ feedback terminal is a terminal for which the base station detects the corresponding preamble sequence and successfully parses out the content in the PUSCH.

Optionally, the Msg.B is further configured to indicate retransmission resource of each retransmission terminal in the at least one terminal, and each retransmission terminal is a terminal for which the base station detects the corresponding preamble sequence and fails to parse out the content in the PUSCH, and the method further includes: retransmitting the PUSCH in the Msg.A on the retransmission resource of the target terminal in response to that the target terminal is any of the retransmission terminals.

In conclusion, after detecting the Msg.A sent by each of the at least one terminal, the base station returns the Msg.B to the at least one terminal. The Msg.B is configured to indicate the feedback parameters of respective HARQ feedback terminals in the at least one terminal. The base station receives the HARQ feedback sent by each HARQ feedback terminal for the Msg.B on the HARQ feedback resource of each HARQ feedback terminal. In the disclosure, the feedback parameters of respective HARQ feedback terminals are indicated in the Msg.B returned by the base station to the at least one terminal, and the HARQ feedback sent by each terminal that needs to perform HARQ feedback is received on different feedback resources, thereby reducing the collision of terminals that need to perform the HARQ feedback using the same HARQ feedback resource, and improving the feedback efficiency of the terminal to the Msg.B.

Figure 6:
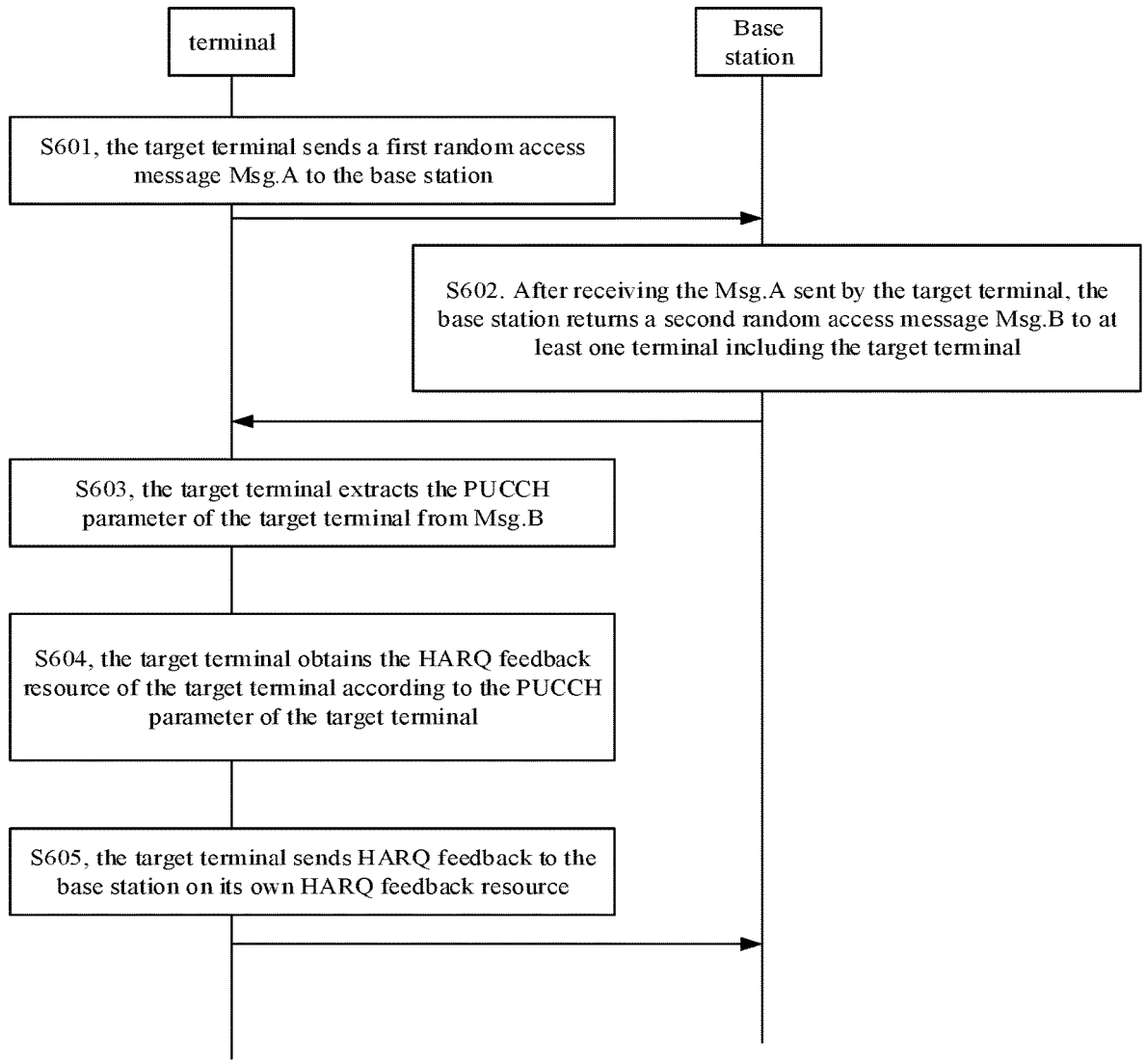
FIG. 6 is a flowchart of a method for HARQ feedback according to an embodiment of the disclosure.

For example, the Msg.B fed back by the base station to the terminal includes PUCCH parameters configured by the base station for respective HARQ feedback terminals. FIG. 6 is a flowchart of a method for HARQ feedback according to an embodiment of the disclosure. As shown in FIG. 6, the method for HARQ feedback may be applied to the wireless communication system shown in FIG. 1, and performed by the base station and the terminal in the system. The method may include the following steps.

In step 601, the target terminal sends a first random access message Msg.A to the base station.

Correspondingly, the base station receives the Msg.A sent by the target terminal.

For the way the target terminal sends the Msg.A to the base station, reference can be made to the description of step 301 in FIG. 3, that is, the Msg.A may include the random access preamble sequence and the PUSCH, and the target terminal can send the Preamble in PRACH and send payload information in the PUSCH, which will not be repeated here.

In step 602, After receiving the Msg.A sent by the target terminal, the base station returns the Msg.B to at least one terminal including the target terminal.

Correspondingly, the target terminal receives the Msg.B returned by the base station.

The Msg.B is configured to indicate a HARQ feedback resource of each HARQ feedback terminal in the at least one terminal, and the HARQ feedback resources of respective HARQ feedback terminals are different.

In the random access process, after the base station receives the Msg.A sent by the terminal, it will actively return the Msg.B to the terminal, so that the random access process of the terminal can continue. If there are other terminals that send the Msg.A to the same base station at the same time, as the target terminal, then when the base station receives the Msg.A from the target terminal, it can also receive the Msg.As sent by other terminals, that is, the base station can receive the Msg.As sent by different terminals including the target terminal at the same time, and the base station can return the Msg.B to these terminals at the same time after receiving the first random access messages Msg.As sent by the target terminal and other terminals.

Figure 7:
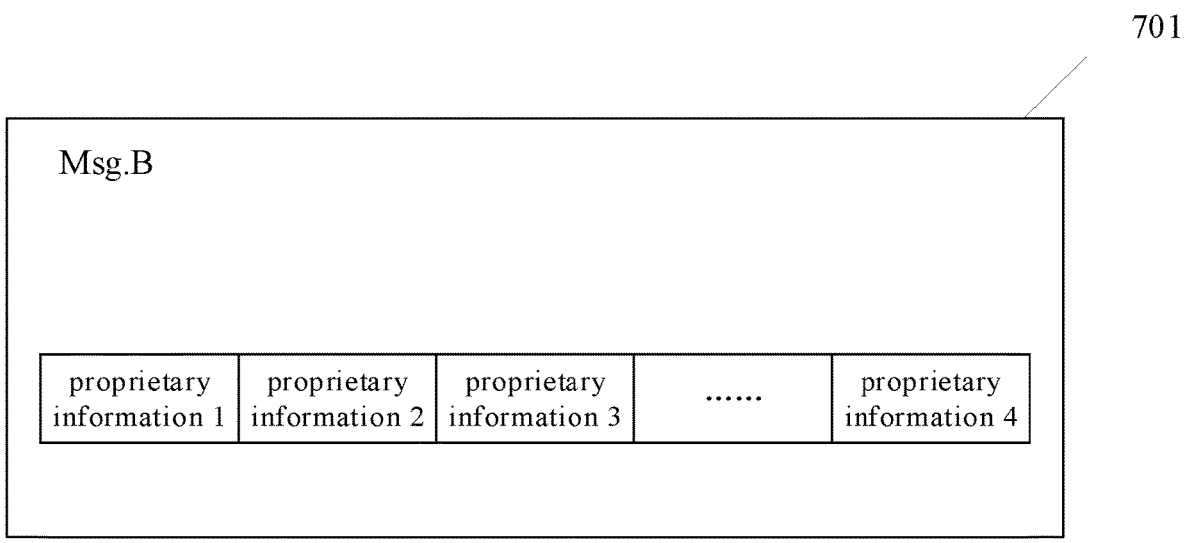
FIG. 7 is a schematic diagram of Msg.B fed back by a base station to a terminal according to an embodiment of the disclosure.

For example, refer to FIG. 7, which is a schematic diagram of a Msg.B fed back by a base station to a terminal according to an embodiment of the disclosure. As shown in FIG. 7, Msg.B 701 returned by the base station is illustrated, and the Msg.B 701 also includes the proprietary information of each terminal. The proprietary information of the target terminal is proprietary information 3. It can be seen from FIG. 7 that the base station can send the Msg.B containing the proprietary information of each terminal to the plurality of terminals. Certainly, if the base station only receives the Msg.A of the target terminal when the target terminal sends the Msg.A to the base station, the Msg.B returned this time may only contain the proprietary information of the target terminal. Optionally, the content of the proprietary information of each terminal in the Msg.B may include the number of the preamble sequence used by the corresponding terminal and information about whether the corresponding terminal needs to perform the HARQ feedback. Each terminal that needs to perform the HARQ feedback is the HARQ feedback terminal in the disclosure.

Taking FIG. 7 as an example again, in a possible implementation, when the target terminal successfully receives the content of the proprietary information 3 transmitted in the PDCCH, it also successfully receives the content of the proprietary information 3 transmitted in the PDSCH, that is, the base station successfully receives the Preamble and the payload information in the Msg.A sent by the target terminal, and the proprietary information 3 returned by the base station to the target terminal contains the random access response on the PDCCH and the contention resolution information on the PDSCH. At this time, if the target terminal successfully receives the proprietary information 3, the target terminal can know that it needs to perform the HARQ feedback on the Msg.B received this time, and the feedback content is an acknowledge character (ACK). At this time, the target terminal is one of the HARQ feedback terminals. That is, each HARQ feedback terminal is a terminal for which the base station detects the corresponding preamble sequence and successfully parses out the content in the corresponding PUSCH.

In a possible implementation, when the target terminal learns from the received proprietary information 3 that the proprietary information 3 contains a specified retransmission resource for the PUSCH (that is, the Msg.B is further configured to indicate the retransmission resource of each retransmission terminal), which indicates that the base station successfully receives the Preamble in the Msg.A sent by the target terminal, but does not successfully receives the payload information transmitted by the target terminal on the PUSCH, and the payload information needs to be retransmitted by the target terminal itself. At this time, according to the successfully received proprietary information 3, the target terminal can know that it needs to retransmit the payload information according to the specified retransmission resource for the PUSCH in the proprietary information 3. At this time, although the target terminal successfully receives the Msg.B returned by the base station, it does not need to perform the HARQ feedback to the base station. At this time, the target terminal is one of the retransmission terminals. That is, each retransmission terminal is a terminal for which the base station detects the corresponding preamble sequence and fails to parse out the content in the corresponding PUSCH. That is, if the target terminal is any of the retransmission terminals, the target terminal can retransmit the PUSCH in the Msg.A on the retransmission resources of the target terminal indicated by the proprietary information 3.

Optionally, if the target terminal is one of the retransmission terminals, the PUSCH in the Msg.A is retransmitted on the retransmission resource of the target terminal. That is, the target terminal does not need to perform the HARQ feedback on the received Msg.B, and directly retransmits the payload information according to the specified retransmission resource for PUSCH in the proprietary information of the Msg.B. In a possible implementation, in FIG. 7, in the Msg.B returned by the base station to the plurality of terminals, the terminals corresponding to proprietary information 1 and proprietary information 2 are the retransmission terminals, and the terminals corresponding to proprietary information 3 and proprietary information 4 are the HARQ feedback terminals. The base station can receive the PUSCH in the Msg.A retransmitted by each retransmission terminal on the retransmission resource corresponding to each retransmission terminal, and receive the HARQ feedback sent by each HARQ feedback terminal for the Msg.B on the HARQ feedback resource corresponding to each HARQ feedback terminal.

In a possible implementation, the Msg.B returned by the base station to the at least one terminal is the Msg.B containing the PUCCH parameters of respective HARQ feedback terminals. The PUCCH parameters of different terminals in the respective HARQ feedback terminals are different. The PUCCH parameter includes the time parameter k and the PUCCH resource indicator $\Delta_{PRI}$. The time parameter k is configured to calculate the time point of sending the HARQ feedback, and the PUCCH resource indicator is configured to calculate the serial number of PUCCH resources used to send the HARQ feedback in the PUCCH resource set. The PUCCH resource set is a candidate PUCCH resource set configured by the high signaling.

That is, the time parameter k is configured to calculate the time point of sending the HARQ feedback sent by the target terminal. For example, the time parameter k may be a time offset added to the time of the HARQ feedback resource calculated by the target terminal according to the end time of the Msg.B returned by the base station. Optionally, the base station may carry the time parameter k configured for the target terminal in the Msg.B and return it to the target terminal. The PUCCH resource indicator $\Delta_{PRI}$ may indicate the PUCCH resource used by the target terminal to send the HARQ feedback. For example, the PUCCH resource indicator may be the indicator value of the 3-bit information field in the Msg.B, that is, the base station can configure the indicator value of the 3-bit information field in the Msg.B for the target terminal, and the PUCCH resource indicator is carried in the Msg.B and sent to the target terminal.

In a possible implementation, the PUCCH parameters of respective HARQ feedback terminals include the common time parameter k shared by the HARQ feedback terminals and the PUCCH resource indicator $\Delta_{PRI}$ of each HARQ feedback terminal. That is, the above time parameter k is shared by the feedback terminal, and the common time parameter k shared by the HARQ feedback terminals may be carried in the PDCCH of the Msg.B. However, each HARQ feedback terminal has its own PUCCH resource indicator $\Delta_{PRI}$, where the PUCCH resource indicator $\Delta_{PRI}$ of each HARQ feedback terminal can be carried in the proprietary information of each HARQ feedback terminal, and the proprietary information of each HARQ feedback terminal is carried in the PDSCH of the Msg. B, such that the PUCCH parameters of respective HARQ feedback terminals are returned to respective terminals through the Msg.B. The proprietary information may refer to the information section in the RAR of each HARQ feedback terminal, which includes an information header and corresponding RAR information.

In a possible implementation, the PUCCH parameters of respective HARQ feedback terminals include the time parameter k of each HARQ feedback terminal and a common PUCCH resource indicator $\Delta_{PRI}$ shared by the HARQ feedback terminals. That is, the PUCCH resource indicator $\Delta_{PRI}$ is shared by the HARQ feedback terminals, and the common PUCCH resource indicator $\Delta_{PRI}$ shared by the HARQ feedback terminals can be carried in the PDCCH of the Msg.B. However, each HARQ feedback terminal has its own time parameter k, the time parameter k of each HARQ feedback terminal can be carried in the proprietary information of each HARQ feedback terminal, and the proprietary information of each HARQ feedback terminal is carried in the PDSCH of the Msg.B, so that the PUCCH parameters of respective HARQ feedback terminals are returned to respective terminals through the Msg.B.

In a possible implementation, the PUCCH parameters of respective HARQ feedback terminals include the time parameter k of each HARQ feedback terminal and the PUCCH resource indicator $\Delta_{PRI}$ of each HARQ feedback terminal. That is, each HARQ feedback terminal has its own time parameter k and its own PUCCH resource indicator $\Delta_{PRI}$. The time parameter k of each HARQ feedback terminal and the PUCCH resource indicator $\Delta_{PRI}$ of each HARQ feedback terminal can be carried in the proprietary information of each HARQ feedback terminal, and the proprietary information of each HARQ feedback terminal is carried in the PDSCH of the Msg.B, so that the PUCCH parameters of respective HARQ feedback terminals are returned to respective terminals through the Msg.B.

In step 603, the target terminal extracts the PUCCH parameter of the target terminal from the Msg.B.

That is, when the target terminal is any one of the HARQ feedback terminals, the target terminal needs to perform HARQ feedback on the received Msg.B. When the target terminal performs the HARQ feedback, it needs to determine its own HARQ feedback resource. Optionally, the target terminal may send the HARQ feedback to the base station for the received Msg.B based on the above scheme of HARQ feedback by the terminals in the NR system. However, the HARQ feedback resource used when the target terminal sends the HARQ feedback for the Msg.B is calculated based on the PUCCH parameter of the target terminal carried in the Msg.B.

In a possible implementation, the target terminal can obtain the PUCCH parameter of the target terminal carried in the Msg.B according to the received Msg.B, and the target terminal can calculate the HARQ feedback resource used when sending the HARQ feedback to the base station according to its own PUCCH parameter.

For example, when the PDCCH of the Msg.B carries the common time parameter k shared by the HARQ feedback terminals, and the PDSCH of the Msg.B carries the PUCCH resource indicator $\Delta_{PRI}$ of the target terminal, the target terminal can extract the corresponding time parameter k and the PUCCH resource indicator $\Delta_{PRI}$ from the Msg.B. Or, when the PDSCH of the Msg.B carries the time parameter k of the target terminal, and the PDCCH of the Msg.B carries the common PUCCH resource indicator $\Delta_{PRI}$ shared by the HARQ feedback terminals, the target terminal can also extract the corresponding time parameter k and the PUCCH resource indicator $\Delta_{PRI}$ from the Msg.B. Or, when the PDSCH of the Msg.B carries the time parameter k of the target terminal and the PUCCH resource indicator $\Delta_{PRI}$ of the target terminal, the target terminal may also extract the corresponding time parameter k and the PUCCH resource indicator $\Delta_{PRI}$ from the Msg.B.

In step 604, the target terminal obtains the HARQ feedback resource of the target terminal based on the PUCCH parameter of the target terminal.

Optionally, the target terminal can calculate the HARQ feedback time based on the HARQ feedback scheme of the terminal in the NR system, and calculate the HARQ feedback time according to the end time of receiving the Msg.B returned by the base station. The target terminal can add the time parameter k extracted by itself to the end time of the received Msg.B from the base station to obtain the HARQ feedback time when the HARQ feedback is sent to the base station. When the HARQ feedback time arrives, the HARQ feedback is sent to the base station.

Optionally, the target terminal may bring the extracted PUCCH resource indicator $\Delta_{PRI}$ into the derivation formula in the HARQ feedback scheme of the terminal in the NR system, to calculate the PUCCH resource number. The target terminal can obtain the specific PUCCH resource in the PUCCH resource set configured by the base station according to the PUCCH resource number corresponding to the PUCCH resource number, and use the PUCCH resource for HARQ feedback.

That is, the target terminal can calculate the HARQ feedback resource used by the target terminal to perform HARQ feedback to the base station at this time, based on the corresponding time parameter k and the PUCCH resource indicator $\Delta_{PRI}$.

When the PUCCH parameters include the common time parameter k shared by the HARQ feedback terminals and the PUCCH resource indicator $\Delta_{PRI}$ of each HARQ feedback terminal, the HARQ feedback time calculated by each HARQ feedback terminal is the same, but the HARQ feedback resource calculated by each HARQ feedback terminal based on the derivation formula is different, thereby avoiding conflicts when respective HARQ feedback terminals perform feedback. When the PUCCH parameters include the time parameter k of each HARQ feedback terminal, and the common PUCCH resource indicator $\Delta_{PRI}$ shared by the HARQ feedback terminals, the HARQ feedback resource calculated by each HARQ feedback terminals according to the above derivation formula is the same, but the HARQ feedback time calculated by each HARQ feedback terminal is different, thereby avoiding confliction when respective HARQ feedback terminals perform feedback. When the PUCCH parameters include the time parameter k of each HARQ feedback terminal and the PUCCH resource indicator $\Delta_{PRI}$ of each HARQ feedback terminal, the HARQ feedback resource calculated by each HARQ feedback terminal according to the above derivation formula is different, and the HARQ feedback time calculated by each HARQ feedback terminal according is also different, thereby avoiding confliction when respective HARQ feedback terminals perform feedback.

In step 605, the target terminal sends the HARQ feedback to the base station on its own HARQ feedback resource.

Correspondingly, the base station receives the HARQ feedback sent by the target terminal for the Msg.B.

When the target terminal is any one of the HARQ feedback terminals, the target terminal may perform the HARQ feedback on the Msg.B received this time according to the HARQ feedback resource obtained by the above calculation. Due to the PUCCH parameters configured in the above manner, the HARQ feedback resources calculated by respective HARQ feedback terminals are different, thereby avoiding conflicts when respective HARQ feedback terminals perform feedback. Optionally, the base station can also calculate the HARQ feedback resource of each HARQ feedback terminal that it needs to monitor according to the PUCCH parameters configured for the terminals, and receive the HARQ feedbacks returned by the target terminal and other HARQ feedback terminals on the corresponding HARQ feedback resources.

In conclusion, after detecting the Msg.A sent by each of the at least one terminal, the base station returns the Msg.B to the at least one terminal. The Msg.B is configured to indicate feedback parameters of respective HARQ feedback terminals in the at least one terminal. The base station receives the HARQ feedback sent by each HARQ feedback terminal for the Msg.B on the HARQ feedback resource of each HARQ feedback terminal. In the disclosure, the feedback parameters of respective HARQ feedback terminals are indicated in the Msg.B returned by the base station to the at least one terminal, and the HARQ feedback sent by each terminal that needs to perform HARQ feedback is received on different feedback resources, thereby reducing the collision of terminals that need to perform HARQ feedback using the same HARQ feedback resource, and to improve the feedback efficiency of the terminal to the Msg.B.

Figure 8:
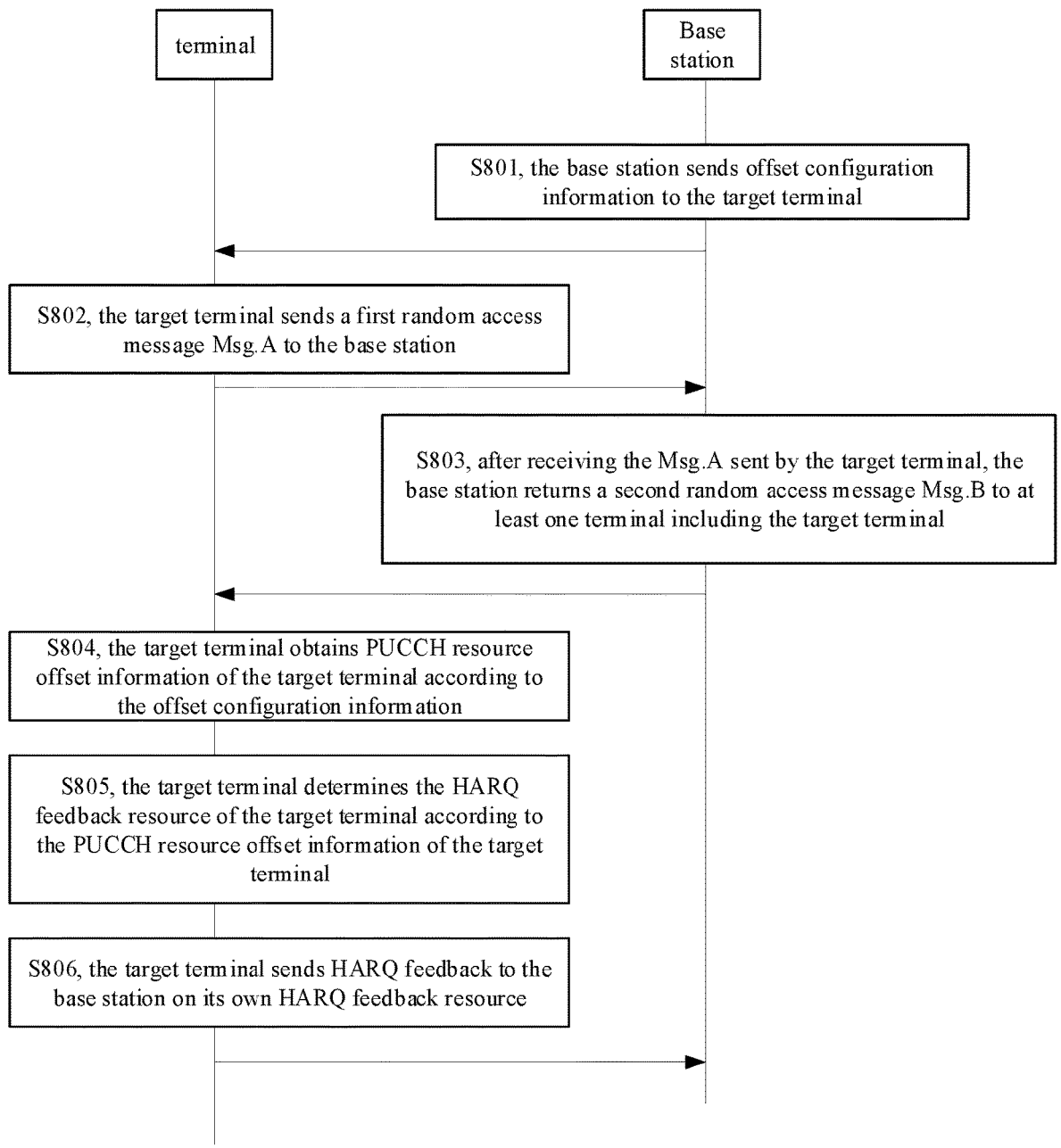
FIG. 8 is a flowchart of a method for HARQ feedback according to an embodiment of the disclosure.

In a possible implementation, each of the at least one terminal including the target terminal can also receive the offset configuration information sent by the base station, and determine the PUCCH resource offset information based on their own offset configuration information, so that the HARQ feedback resource is determined based on the PUCCH resource offset information. Please refer to FIG. 8, which is a flowchart of a method for HARQ feedback according to an embodiment of the disclosure. The method may be applied to the wireless communication system shown in FIG. 1, and is performed by the base station and the target terminal in the system. Optionally, the terminal may be a target terminal. As shown in FIG. 8, the method may include the following steps.

In step 801, the base station sends the offset configuration information to the target terminal.

Correspondingly, the target terminal receives the offset configuration information sent by the base station.

Optionally, the base station configures unified offset configuration information for a plurality of terminals. The base station can send the configured offset configuration information to each terminal through the broadcast channel. Alternatively, the base station can also send the offset configuration information to the target terminal or other terminals through the high signaling after successfully establishing random access with the target terminal or other terminals, so that the target terminal and other terminals can receive the offset configuration information sent by the base station for being used directly in the subsequent calculation of the PUCCH resource offset information.

In step 802, the target terminal sends the Msg.A to the base station.

Correspondingly, the base station receives the Msg.A sent by the target terminal.

In step 803, after receiving the first random access message Msg.A sent by the target terminal, the base station returns the second random access message Msg.B to the at least one terminal including the target terminal.

Correspondingly, the target terminal receives the Msg.B returned by the base station.

For step 802 and step 803, reference may be made to the description of step 601 and step 602 in the embodiment shown in FIG. 6, which will not be repeated here. Optionally, in step 803, the Msg.B returned by the base station to the at least one terminal including the target terminal may not include the PUCCH parameters of respective HARQ feedback terminals, that is, in embodiments of the disclosure, the target terminal and each HARQ feedback terminal can determine its own HARQ feedback resource directly based on the offset configuration information obtained in step 801.

In step 804, the target terminal obtains the PUCCH resource offset information of the target terminal based on the offset configuration information.

The PUCCH resource offset information is configured to indicate the offset of the PUCCH resource used for sending HARQ feedback relative to the reference PUCCH resource. The reference PUCCH resource is the PUCCH resource calculated based on the PUCCH resource indicator $\Delta_{PRI}$.

That is, if the target terminal calculates the first PUCCH resource number according to the derivation formula in the HARQ feedback scheme of the terminal in the above NR system, the PUCCH resource corresponding to the first PUCCH resource number is the reference PUCCH resource, and the target terminal needs to add its own PUCCH resource offset information to the first PUCCH resource number, to obtain a new PUCCH resource number.

In a possible implementation, the offset configuration information may also include the PUCCH resource offset information corresponding to each random access preamble sequence. The target terminal may query the offset configuration information according to the preamble sequence contained in the Msg.A sent by the target terminal, and obtain the PUCCH resource offset information of the target terminal. Optionally, the target terminal can query the offset configuration information that has been received according to the number of the preamble sequence contained in the Msg.A sent by itself, and obtain its own PUCCH resource offset information according to the number of the preamble sequence sent by itself and the offset configuration information. For example, Table 1 shows a correspondence table between the number of preamble sequence and the PUCCH resource offset information involved in an embodiment of the disclosure.

TABLE 1

| number of preamble sequence | PUCCH resource offset information |
|---|---|
| NO. 1 | resource offset information 1 |
| NO. 2 | resource offset information 2 |
| NO. 3 | resource offset information 3 |
| ... | ... |

As shown in Table 1, the target terminal can query Table 1 according to the preamble sequence number sent by itself, so as to obtain its own resource offset information. For example, if the number of preamble sequence sent by the target terminal is NO. 1 in Table 1, the PUCCH resource offset information obtained by the target terminal is resource offset information 1.

In a possible implementation, the Msg.B returned by the base station to the target terminal includes the proprietary information of each of the at least one terminal. The offset configuration information may also include the PUCCH resource offset information corresponding to the location of the proprietary information in the Msg.B. The target terminal can query the offset configuration information according to the location of the proprietary information of the target terminal contained in the received Msg.B in the Msg.B, and obtain the PUCCH resource offset information of the target terminal. Optionally, the target terminal can query the received offset configuration information according to the location number of its own proprietary information in the Msg.B received by itself, to obtain its own PUCCH resource offset information according to the location number of its own proprietary information in the Msg.B and the offset configuration information. For example, please refer to Table 2, which shows the correspondence table between the location number of proprietary information and the PUCCH resource offset information involved in embodiments of the disclosure.

TABLE 2

| location number of proprietary information | PUCCH resource offset information |
|---|---|
| location number 1 | resource offset information 1 |
| location number 2 | resource offset information 2 |
| location number 3 | resource offset information 3 |
| ... | ... |

As shown in Table 2, the target terminal can query Table 2 according to the location number of its own proprietary information in the Msg.B received by itself, so as to obtain its own resource offset information. For example, taking FIG. 7 as an example, the location number of its own proprietary information in the Msg.B received by the target terminal is the location corresponding to the third information field. If the location number corresponding to the third information field is location number 3 in Table 2 above, the PUCCH resource offset information obtained by the target terminal is resource offset information 3.

In a possible implementation, the target terminal may also calculate the corresponding PUCCH resource offset information according to the location number of its own proprietary information in the Msg.B received by itself and the offset configuration information obtained by the target terminal. For example, the offset configuration information sent by the base station in step 801 is a fixed Offset0 value and a calculation formula for calculating PUCCH resource offset information is:

$Y=X*Offset0;$

Y is the PUCCH resource offset information, and X is the corresponding location number. Optionally, the target terminal can also calculate the PUCCH resource offset information according to the location number of its own proprietary information in the Msg.B received by itself, and the offset configuration information calculation formula obtained by the target terminal: Y=X*Offset0. For example, taking FIG. 7 as an example again, the location number of its own proprietary information in the Msg.B received by the target terminal is the location corresponding to the third information field, if the location number corresponding to the third information field is location number 3 in Table 2 above, then the target terminal brings it into the above formula to obtain PUCCH resource offset information which is 3*Offset0.

In step 805, the target terminal determines the HARQ feedback resource of the target terminal according to the PUCCH resource offset information of the target terminal.

Optionally, after obtaining its own PUCCH resource offset information, the target terminal may determine its own HARQ feedback resource according to the PUCCH resource offset information and the PUCCH resource number obtained by itself through the above derivation formula. For the process of obtaining the PUCCH resource number by the target terminal through the derivation formula, reference can be made to the description in step 604, which will not be repeated here.

In this step, the target terminal also needs to further calculate the target PUCCH resource number based on the PUCCH resource offset information obtained above, wherein the HARQ feedback resource corresponding to the target PUCCH resource number is the HARQ feedback resource used by the target terminal for performing HARQ feedback. Optionally, for the calculation method of the target PUCCH resource number, reference may be made to the following formula:

$$N_{PUCCH} = (r_{PUCCH} + P) \bmod R_{PUCCH};$$

$N_{PUCCH}$ is the calculated target PUCCH resource number, and P is the PUCCH resource offset information obtained by the target terminal. For example, the PUCCH resource set configured by the base station for the target terminal is shown in Table 3. Table 3 shows a PUCCH resource set configuration table for multiple terminals involved in an embodiment of the disclosure.

TABLE 3

| PUCCH resource number | PUCCH resource |
|---|---|
| 1 | PUCCH 1 |
| 2 | PUCCH 2 |
| 3 | PUCCH 3 |
| 4 | PUCCH 4 |
| 5 | PUCCH 5 |

As shown in Table 3, the respective HARQ feedback terminals described above can use these 5 PUCCH resources to perform HARQ feedback to the base station. If the PUCCH resource offset information 2 is obtained by the target terminal, the target terminal can first calculate the PUCCH resource number $r_{PUCCH}$ to be 4 according to the derivation formula in the HARQ feedback scheme of the terminal in the above NR system. Then, the target terminal can calculate the $N_{PUCCH}$ to be 1 according to the above calculation formula of the target PUCCH resource number, the target terminal can obtain the PUCCH2 resource in the PUCCH resource set configured by the base station according to the target PUCCH resource number, and use the PUCCH2 resource as the HARQ feedback resource used for sending HARQ feedback to the base station for the Msg.B this time.

In step 806, the target terminal sends HARQ feedback to the base station on its own HARQ feedback resource.

Correspondingly, the base station receives the HARQ feedback sent by the target terminal for the Msg.B.

Optionally, for the implementation in step 806, reference may be made to the description in step 605 above, which will not be repeated here.

In conclusion, after detecting the Msg.A sent by each of the at least one terminal, the base station returns the Msg.B to the at least one terminal. The Msg.B is configured to indicate the feedback parameters of respective HARQ feedback terminals in the at least one terminal. The base station receives the HARQ feedback sent by each HARQ feedback terminal for the Msg.B on the HARQ feedback resource of each HARQ feedback terminal. In the disclosure, the Msg.B returned by the base station to the at least one terminal is configured to indicate the feedback parameters of respective HARQ feedback terminals, and the HARQ feedback sent by each terminal that needs to perform HARQ feedback is received on different feedback resources, thereby reducing the collision of terminals that need to perform the HARQ feedback using the same HARQ feedback resource, and improving the feedback efficiency of the terminal to the Msg.B.

The following are apparatus embodiments of the disclosure, which can be used to implement the method embodiments of the disclosure. For details that are not disclosed in the apparatus embodiments of the disclosure, reference may be made to the method embodiments of the disclosure.

Figure 9:
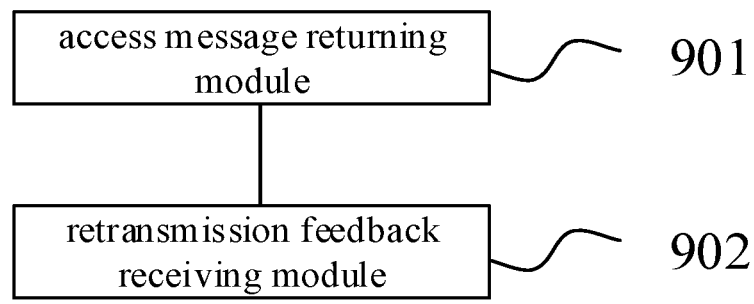
FIG. 9 is a block diagram of an apparatus for HARQ feedback according to an exemplary embodiment.

FIG. 9 is a block diagram of an apparatus for HARQ feedback according to an exemplary embodiment. As shown in FIG. 9, the apparatus for HARQ feedback may be implemented as a whole or a part of the base station in the implementation environment shown in FIG. 1 through hardware or a combination of software and hardware, to perform steps performed by the base station in any one of the embodiments shown in FIG. 3 or FIG. 6. The apparatus for HARQ feedback may include: an access message returning module 901 and a retransmission feedback receiving module 902.

The access message returning module 901 is configured to return a second random access message Msg.B to at least one terminal after receiving a first random access message Msg.A sent by each of the at least one terminal, in which the Msg.B is configured to indicate a HARQ feedback resource of each HARQ feedback terminal in the at least one terminal, and the HARQ feedback resources of respective HARQ feedback terminals are different.

The retransmission feedback receiving module 902 is configured to receive a HARQ feedback sent by each HARQ feedback terminal for the Msg.B on the HARQ feedback resource of each HARQ feedback terminal.

Optionally, the access message returning module 901 is configured to:

return the Msg.B including physical uplink control channel (PUCCH) parameters of respective HARQ feedback terminals to the at least one terminal, in which the PUCCH parameters of different terminals in the respective HARQ feedback terminals are different; in which the PUCCH parameter includes a time parameter k and a PUCCH resource indicator $\Delta_{PRI}$; the time parameter k is configured to calculate a time point of sending the HARQ feedback, and the PUCCH resource indicator $\Delta_{PRI}$ is configured to calculate a serial number of PUCCH resource for sending the HARQ feedback in a PUCCH resource set; and the PUCCH resource set is a candidate PUCCH resource set configured by a high signaling.

Optionally, the PUCCH parameters of respective HARQ feedback terminals include a common time parameter k shared by the HARQ feedback terminals, and the PUCCH resource indicator $\Delta_{PRI}$ of each HARQ feedback terminal; or, the PUCCH parameters of respective HARQ feedback terminals include the time parameter k of each HARQ feedback terminal, and a common PUCCH resource indicator $\Delta_{PRI}$ shared by the HARQ feedback terminals; or, the PUCCH parameters of respective HARQ feedback terminals include the time parameter k of each HARQ feedback terminal, and the PUCCH resource indicator $\Delta_{PRI}$ of each HARQ feedback terminal.

Optionally, when the PUCCH parameters of respective HARQ feedback terminals include the common time parameter k shared by the HARQ feedback terminals, and the PUCCH resource indicator $\Delta_{PRI}$ of each HARQ feedback terminal, the common time parameter k shared by the HARQ feedback terminals is carried in a PDCCH of the Msg.B; and the PUCCH resource indicator $\Delta_{PRI}$ of each HARQ feedback terminal is carried in proprietary information of each HARQ feedback terminal, and the proprietary information of each HARQ feedback terminal is carried in the PDSCH of the Msg.B.

Optionally, when the PUCCH parameters of respective HARQ feedback terminals include the time parameter k of each HARQ feedback terminal, and a common PUCCH resource indicator $\Delta_{PRI}$ shared by the HARQ feedback terminals, the common PUCCH resource indicator $\Delta_{PRI}$ shared by the HARQ feedback terminals is carried in a PDCCH of the Msg.B; and the time parameter k of each HARQ feedback terminal is carried in proprietary information of each HARQ feedback terminal, and the proprietary information of each HARQ feedback terminal is carried in the PDSCH of the Msg.B.

Optionally, when the PUCCH parameters of respective HARQ feedback terminals include the time parameter k of each HARQ feedback terminal, and the PUCCH resource indicator $\Delta_{PRI}$ of each HARQ feedback terminal, the time parameter k of each HARQ feedback terminal and the PUCCH resource indicator $\Delta_{PRI}$ of each HARQ feedback terminal are carried in the proprietary information of each HARQ feedback terminal, in which the proprietary information of each HARQ feedback terminal is carried in the PDSCH of the Msg.B.

Optionally, the apparatus further includes: an offset information obtaining module and a feedback resource determining module.

The offset information obtaining module is configured to obtain PUCCH resource offset information of each HARQ feedback terminal based on offset configuration information, before the retransmission feedback receiving module 902 receives the HARQ feedback sent by each HARQ feedback terminal for the Msg.B on the HARQ feedback resource of each HARQ feedback terminal, in which the PUCCH resource offset information is configured to indicate an offset of the PUCCH resource for sending the HARQ feedback relative to a reference PUCCH resource, the reference PUCCH resource is a PUCCH resource calculated based on the PUCCH resource indicator $\Delta_{PRI}$.

The feedback resource determining module is configured to determine the HARQ feedback resource of each HARQ feedback terminal based on the PUCCH resource offset information of each HARQ feedback terminal.

Optionally, the offset configuration information includes PUCCH resource offset information of each random access preamble sequence, and the offset information obtaining module is further configured to obtain the PUCCH resource offset information of each HARQ feedback terminal by querying the offset configuration information based on a preamble sequence included in the Msg.A sent by each HARQ feedback terminal.

Optionally, the Msg.B includes the proprietary information of each of the at least one terminal, and the offset configuration information includes the PUCCH resource offset information corresponding to a location where the proprietary information is in the Msg.B. The offset information obtaining module is further configured to: obtain the PUCCH resource offset information of each HARQ feedback terminal by querying the offset configuration information based on a location of the proprietary information of each HARQ feedback terminal in the Msg.B.

Optionally, the apparatus further includes: a configuration information sending module. The configuration information sending module is configured to send the offset configuration information through a broadcast channel before the access message returning module 901 returns the Msg.B to the at least one terminal.

Optionally, the Msg.A includes the random access preamble sequence and the PUSCH. The HARQ feedback terminal is a terminal for which the base station detects the corresponding preamble sequence and successfully parses out content in the PUSCH.

Optionally, the at least one terminal further includes respective retransmission terminals, and the retransmission terminal is a terminal for which the base station detects the corresponding preamble sequence and fails to parse out the content in the PUSCH, the Msg.B is further configured to indicate a retransmission resource of each retransmission terminal. The apparatus further includes: a retransmission message receiving module. The retransmission message receiving module is configured to receive the PUSCH in the Msg.A of each retransmission terminal that is retransmitted by each retransmission terminal on the retransmission resource of each retransmission terminal. Each retransmission terminal is any one of the respective retransmission terminals.

Figure 10:
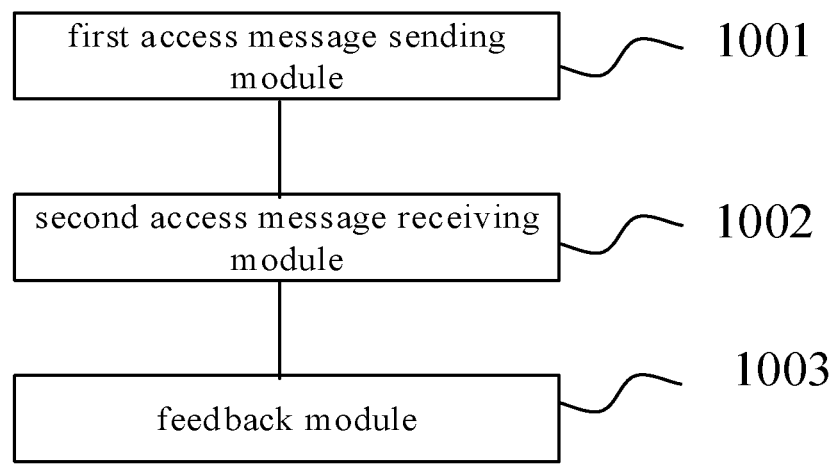
FIG. 10 is a block diagram of an apparatus for HARQ feedback according to an exemplary embodiment.

FIG. 10 is a block diagram of an apparatus for HARQ feedback according to an exemplary embodiment. As shown in FIG. 10, the apparatus for HARQ feedback may be implemented as a whole or a part of the terminal in the implementation environment shown in FIG. 1 through hardware or a combination of software and hardware, to perform the steps performed by the target terminal in any one of the embodiments shown in FIG. 4 or FIG. 8. The apparatus for HARQ feedback may include: a first access message sending module 1001, a second access message receiving module 1002 and a feedback module 1003.

The first access message sending module 1001 is configured to send a first random access message Msg.A to a base station.

The second access message receiving module 1002 is configured to receive a second random access message Msg.B returned by the base station, in which the Msg.B is configured to indicate a HARQ feedback resource of each HARQ feedback terminal in at least one terminal, and the HARQ feedback resources of respective HARQ feedback terminals are different.

The feedback module 1003 is configured to send a HARQ feedback to the base station in response to that the target terminal is any one of the respective HARQ feedback terminals.

Optionally, the Msg.B includes PUCCH parameters of respective HARQ feedback terminals, and the PUCCH parameters of different terminals in the respective HARQ feedback terminals are different, and the apparatus further includes: a parameter extracting module and a feedback resource obtaining module.

The parameter extracting module is configured to extract the PUCCH parameter of the target terminal from the Msg.B before the feedback module 1003 sends the HARQ feedback to the base station on the HARQ feedback resource of the target terminal.

The feedback resource obtaining module is configured to obtain the HARQ feedback resource of the target terminal based on the PUCCH parameter of the target terminal.

The PUCCH parameter includes a time parameter k and a PUCCH resource indicator $\Delta_{PRI}$; the time parameter k is configured to calculate a time point of sending the HARQ feedback, and the PUCCH resource indicator $\Delta_{PRI}$ is configured to calculate a serial number of the PUCCH resource for sending the HARQ feedback in a PUCCH resource set, the PUCCH resource set is a candidate PUCCH resource set configured by a high signaling.

Optionally, the PUCCH parameters of respective HARQ feedback terminals include a common time parameter k shared by the HARQ feedback terminals, and the PUCCH resource indicator $\Delta_{PRI}$ of each HARQ feedback terminal; or, the PUCCH parameters of respective HARQ feedback terminals include the time parameter k of each HARQ feedback terminal, and a common PUCCH resource indicator $\Delta_{PRI}$ shared by the HARQ feedback terminals; or, the PUCCH parameters of respective HARQ feedback terminals include the time parameter k of each HARQ feedback terminal, and the PUCCH resource indicator $\Delta_{PRI}$ of each HARQ feedback terminal.

Optionally, when the PUCCH parameters of respective HARQ feedback terminals include the common time parameter k shared by the HARQ feedback terminals, and the PUCCH resource indicator $\Delta_{PRI}$ of each HARQ feedback terminal, the common time parameter k shared by the HARQ feedback terminals is carried in a PDCCH of the Msg.B; and the PUCCH resource indicator $\Delta_{PRI}$ of each HARQ feedback terminal is carried in proprietary information of each HARQ feedback terminal, and the proprietary information of each HARQ feedback terminal is carried in the PDSCH of the Msg.B.

Optionally, when the PUCCH parameters of respective HARQ feedback terminals include the time parameter k of each HARQ feedback terminal, and a common PUCCH resource indicator $\Delta_{PRI}$ shared by the HARQ feedback terminals, the common PUCCH resource indicator $\Delta_{PRI}$ shared by the HARQ feedback terminals is carried in a PDCCH of the Msg.B; and the time parameter k of each HARQ feedback terminal is carried in proprietary information of each HARQ feedback terminal, and the proprietary information of each HARQ feedback terminal is carried in the PDSCH of the Msg.B.

Optionally, when the PUCCH parameters of respective HARQ feedback terminals include the time parameter k of each HARQ feedback terminal, and the PUCCH resource indicator $\Delta_{PRI}$ of each HARQ feedback terminal, the time parameter k of each HARQ feedback terminal and the PUCCH resource indicator $\Delta_{PRI}$ of each HARQ feedback terminal are carried in the proprietary information of each HARQ feedback terminal, in which the proprietary information of each HARQ feedback terminal is carried in the PDSCH of the Msg.B.

Optionally, the apparatus further includes: an offset information obtaining module and a feedback resource determining module.

The offset information obtaining module is configured to obtain PUCCH resource offset information of the target terminal based on offset configuration information, before the feedback module 1003 sends the HARQ feedback to the base station on the HARQ feedback resource of the target terminal, in which the PUCCH resource offset information is configured to indicate an offset of the PUCCH resource for sending the HARQ feedback relative to a reference PUCCH resource, and the reference PUCCH resource is a PUCCH resource calculated based on the PUCCH resource indicator $\Delta_{PRI}$.

The feedback resource determining module is configured to determine the HARQ feedback resource of the target terminal based on the PUCCH resource offset information of the target terminal.

Optionally, the offset configuration information includes the PUCCH resource offset information of each random access preamble sequence, and the offset information obtaining module is further configured to: obtain the PUCCH resource offset information of the target terminal by querying the offset configuration information based on the preamble sequence in the Msg.A sent by the target terminal.

Optionally, the Msg.B includes the proprietary information of each of the at least one terminal, and the offset configuration information includes the PUCCH resource offset information corresponding to a location of the proprietary information in the Msg.B. The offset information obtaining module is further configured to: obtain the PUCCH resource offset information of the target terminal by querying the offset configuration information based on the location of the proprietary information of the target terminal in the Msg. B.

Optionally, the apparatus further includes: a configuration information receiving module. The configuration information receiving module is configured to receive the offset configuration information sent by the base station through a broadcast channel before the first access message sending module 1001 sends the Msg.A to the base station.

Optionally, the Msg.A includes a random access preamble sequence and a PUSCH. The HARQ feedback terminal is a terminal for which the base station detects the corresponding preamble sequence and successfully parses out the content in the PUSCH.

Optionally, the Msg.B is further configured to indicate the retransmission resource of each retransmission terminal in the at least one terminal, and each retransmission terminal is a terminal for which the base station detects the corresponding preamble sequence and fails to parse out the content in the PUSCH, and the apparatus further includes: a retransmission message sending module.

The retransmission message sending module is configured to retransmit the PUSCH in the Msg.A on the retransmission resource of the target terminal in response to that the target terminal is any of the retransmission terminals.

It should be noted that, when the apparatus provided in the above embodiment realizes its functions, only the division of the above functional modules is used as an example for illustration. In actual applications, the above functions can be allocated by different functional modules according to actual needs. That is, the content structure of the apparatus is divided into different functional modules to complete all or part of the functions described above.

Regarding the apparatus in the foregoing embodiment, the specific manner in which each module performs the operation has been described in detail in the embodiment of the method, and a detailed description will not be given here.

An exemplary embodiment of the disclosure provides an apparatus for HARQ feedback that can implement all or part of the steps performed by a base station in the embodiment shown in FIG. 3 or FIG. 6 of the disclosure. The apparatus for HARQ feedback includes: a processor, and a memory configured to store instructions executable by the processor.

The processor is configured to:
return a second random access message Msg.B to at least one terminal after receiving a first random access message Msg.A sent by each of the at least one terminal, in which the Msg.B is configured to indicate a HARQ feedback resource of each HARQ feedback terminal in the at least one terminal, and the HARQ feedback resources of respective HARQ feedback terminals are different; and
receive a HARQ feedback sent by each HARQ feedback terminal for the Msg.B on the HARQ feedback resource of each HARQ feedback terminal.

Optionally, when returning the Msg.B to the at least one terminal, the processor is configured to: return the Msg.B comprising PUCCH parameters of respective HARQ feedback terminals to the at least one terminal, in which the PUCCH parameters of different terminals in the respective HARQ feedback terminals are different.

The PUCCH parameter includes a time parameter k and a PUCCH resource indicator $\Delta_{PRI}$; the time parameter k is configured to calculate a time point of sending the HARQ feedback, and the PUCCH resource indicator $\Delta_{PRI}$ is configured to calculate a serial number of PUCCH resources for sending the HARQ feedback in a PUCCH resource set; and the PUCCH resource set is a candidate PUCCH resource set configured by a high signaling.

Optionally, the processor is configured such that, the PUCCH parameters of respective HARQ feedback terminals include a common time parameter k shared by the HARQ feedback terminals, and the PUCCH resource indicator $\Delta_{PRI}$ of each HARQ feedback terminal; or,
the PUCCH parameters of respective HARQ feedback terminals include the time parameter k of each HARQ feedback terminal, and a common PUCCH resource indicator $\Delta_{PRI}$ shared by the HARQ feedback terminals; or,
the PUCCH parameters of respective HARQ feedback terminals include the time parameter k of each HARQ feedback terminal, and the PUCCH resource indicator $\Delta_{PRI}$ of each HARQ feedback terminal.

Optionally, the processor is configured such that, when the PUCCH parameters of respective HARQ feedback terminals include the common time parameter k shared by the HARQ feedback terminals, and the PUCCH resource indicator $\Delta_{PRI}$ of each HARQ feedback terminal,
the common time parameter k shared by the HARQ feedback terminals is carried in a PDCCH of the Msg.B; and
the PUCCH resource indicator $\Delta_{PRI}$ of each HARQ feedback terminal is carried in proprietary information of each HARQ feedback terminal, and the proprietary information of each HARQ feedback terminal is carried in the PDSCH of the Msg.B.

Optionally, the processor is configured such that, when the PUCCH parameters of respective HARQ feedback terminals include the time parameter k of each HARQ feedback terminal, and the common PUCCH resource indicator $\Delta_{PRI}$ shared by the HARQ feedback terminals,
the common PUCCH resource indicator $\Delta_{PRI}$ shared by the HARQ feedback terminals is carried in a PDCCH of the Msg.B; and
the time parameter k of each HARQ feedback terminal is carried in proprietary information of each HARQ feedback terminal, and the proprietary information of each HARQ feedback terminal is carried in the PDSCH of the Msg.B.

Optionally, the processor is configured such that, when the PUCCH parameters of respective HARQ feedback terminals include the time parameter k of each HARQ feedback terminal, and the PUCCH resource indicator $\Delta_{PRI}$ of each HARQ feedback terminal,
the time parameter k of each HARQ feedback terminal and the PUCCH resource indicator $\Delta_{PRI}$ of each HARQ feedback terminal are carried in the proprietary information of each HARQ feedback terminal, in which the proprietary information of each HARQ feedback terminal is carried in the PDSCH of the Msg.B.

Optionally, the processor is further configured to:
before receiving the HARQ feedback sent by each HARQ feedback terminal for the Msg.B on the HARQ feedback resource of each HARQ feedback terminal, obtain PUCCH resource offset information of each HARQ feedback terminal based on offset configuration information, wherein the PUCCH resource offset information is configured to indicate an offset of the PUCCH resource for sending the HARQ feedback relative to a reference PUCCH resource, the reference PUCCH resource is a PUCCH resource calculated based on the PUCCH resource indicator $\Delta_{PRI}$; and determine the HARQ feedback resource of each HARQ feedback terminal based on the PUCCH resource offset information of each HARQ feedback terminal.

Optionally, the processor is configured such that, the offset configuration information includes PUCCH resource offset information of each random access preamble sequence, and obtaining the PUCCH resource offset information of each HARQ feedback terminal based on the offset configuration information includes: obtaining the PUCCH resource offset information of each HARQ feedback terminal by querying the offset configuration information based on a preamble sequence included in the Msg.A sent by each HARQ feedback terminal.

Optionally, the processor is configured such that, the Msg.B includes the proprietary information of each of the at least one terminal, and the offset configuration information includes the PUCCH resource offset information corresponding to a location where the proprietary information is in the Msg.B; and
obtaining the PUCCH resource offset information of each HARQ feedback terminal based on the offset configuration information includes:

obtaining the PUCCH resource offset information of each HARQ feedback terminal by querying the offset configuration information based on a location of the proprietary information of each HARQ feedback terminal in the Msg.B.

Optionally, the processor is further configured to: send the offset configuration information through the broadcast channel before returning the Msg.B to the at least one terminal.

Optionally, the Msg.A includes the random access preamble sequence and the PUSCH. The HARQ feedback terminal is a terminal for which the base station detects the corresponding preamble sequence and successfully parses out a content in the PUSCH.

Optionally, the at least one terminal further includes respective retransmission terminals, and the retransmission terminal is a terminal where the base station detects the corresponding preamble sequence and fails to parse out the content in the PUSCH. The Msg.B is further configured to indicate a retransmission resource of each retransmission terminal.

The processor is further configured to receive the PUSCH in the Msg.A of each retransmission terminal that is retransmitted by each retransmission terminal on the retransmission resource of each retransmission terminal. Each retransmission terminal is any of the respective retransmission terminals.

An exemplary embodiment of the disclosure provides an apparatus for HARQ feedback that can implement all or part of the steps performed by the target terminal in the embodiment shown in FIG. 4 or FIG. 8 of the disclosure. The apparatus for HARQ feedback includes: a processor, and a memory configured to store instructions executable by the processor.

The processor is configured to:
send a first random access message Msg.A to a base station;
receive a second random access message Msg.B returned by the base station, in which the Msg.B is configured to indicate a HARQ feedback resource of each HARQ feedback terminal in at least one terminal, and the HARQ feedback resources of respective HARQ feedback terminals are different; and
send a HARQ feedback to the base station in response to that the target terminal is any one of the HARQ feedback terminals.

Optionally, the Msg.B includes the PUCCH parameters of respective HARQ feedback terminals, and the PUCCH parameters of different terminals in the respective HARQ feedback terminals are different.

before sending the HARQ feedback to the base station on the HARQ feedback resource of the target terminal, the processor is further configured to:
extract the PUCCH parameter of the target terminal from the Msg.B; and
obtain the HARQ feedback resource of the target terminal based on the PUCCH parameter of the target terminal.

The PUCCH parameter includes a time parameter k and a PUCCH resource indicator $\Delta_{PRI}$; the time parameter k is configured to calculate a time point of sending the HARQ feedback, and the PUCCH resource indicator $\Delta_{PRI}$ is configured to calculate a serial number of the PUCCH resource for sending the HARQ feedback in a PUCCH resource set, the PUCCH resource set is a candidate PUCCH resource set configured by a high signaling.

Optionally, the PUCCH parameters of respective HARQ feedback terminals include a common time parameter k shared by the HARQ feedback terminals, and the PUCCH resource indicator $\Delta_{PRI}$ of each HARQ feedback terminal; or, the PUCCH parameters of respective HARQ feedback terminals include the time parameter k of each HARQ feedback terminal, and a common PUCCH resource indicator $\Delta_{PRI}$ shared by the HARQ feedback terminals; or, the PUCCH parameters of respective HARQ feedback terminals include the time parameter k of each HARQ feedback terminal, and the PUCCH resource indicator $\Delta_{PRI}$ of each HARQ feedback terminal.

Optionally, when the PUCCH parameters of respective HARQ feedback terminals include the common time parameter k shared by the HARQ feedback terminals, and the PUCCH resource indicator $\Delta_{PRI}$ of each HARQ feedback terminal,
the common time parameter k shared by the HARQ feedback terminals is carried in a PDCCH of the Msg.B; and
the PUCCH resource indicator $\Delta_{PRI}$ of each HARQ feedback terminal is carried in proprietary information of each HARQ feedback terminal, and the proprietary information of each HARQ feedback terminal is carried in the PDSCH of the Msg.B.

Optionally, when the PUCCH parameters of respective HARQ feedback terminals include the time parameter k of each HARQ feedback terminal, and the common PUCCH resource indicator $\Delta_{PRI}$ shared by the HARQ feedback terminals,
the common PUCCH resource indicator $\Delta_{PRI}$ shared by the HARQ feedback terminals is carried in a PDCCH of the Msg.B; and
the time parameter k of each HARQ feedback terminal is carried in proprietary information of each HARQ feedback terminal, and the proprietary information of each HARQ feedback terminal is carried in the PDSCH of the Msg.B.

Optionally, when the PUCCH parameters of respective HARQ feedback terminals include the time parameter k of each HARQ feedback terminal, and the PUCCH resource indicator $\Delta_{PRI}$ of each HARQ feedback terminal,
the time parameter k of each HARQ feedback terminal and the PUCCH resource indicator $\Delta_{PRI}$ of each HARQ feedback terminal are carried in the proprietary information of each HARQ feedback terminal, in which the proprietary information of each HARQ feedback terminal is carried in the PDSCH of the Msg.B.

Optionally, before sending the HARQ feedback to the base station on the HARQ feedback resource of the target terminal, the processor is further configured to:
obtain PUCCH resource offset information of the target terminal based on offset configuration information, in which the PUCCH resource offset information is configured to indicate an offset of the PUCCH resource for sending the HARQ feedback relative to a reference PUCCH resource, and the reference PUCCH resource is a PUCCH resource calculated based on the PUCCH resource indicator $\Delta_{PRI}$; and
determine the HARQ feedback resource of the target terminal based on the PUCCH resource offset information of the target terminal.

Optionally, the processor is configured such that, the offset configuration information includes the PUCCH resource offset information corresponding to each random access preamble sequence;

obtaining the PUCCH resource offset information of the target terminal based on the offset configuration information includes:

obtaining the PUCCH resource offset information of the target terminal by querying the offset configuration information based on the preamble sequence in the Msg.A sent by the target terminal.

Optionally, the Msg.B includes the proprietary information of each of the at least one terminal, and the offset configuration information includes the PUCCH resource offset information corresponding to a location of the proprietary information in the Msg.B;

obtaining the PUCCH resource offset information of the target terminal based on the offset configuration information, includes:

obtaining the PUCCH resource offset information of the target terminal by querying the offset configuration information based on the location of the proprietary information of the target terminal in the Msg. B.

Optionally, before sending the Msg.A to the base station, the processor is further configured to: receive the offset configuration information sent by the base station through the broadcast channel.

Optionally, the Msg.A includes a random access preamble sequence and a PUSCH. The HARQ feedback terminal is a terminal for which the base station detects the corresponding preamble sequence and successfully parses out the content in the PUSCH.

Optionally, the Msg.B is further configured to indicate a retransmission resource of each retransmission terminal in the at least one terminal, and each retransmission terminal is a terminal for which the base station detects the corresponding preamble sequence and fails to parse out the content in the PUSCH. The processor is further configured to: retransmit the PUSCH in the Msg.A on the retransmission resource of the target terminal in response to that the target terminal is any of respective retransmission terminals.

The foregoing mainly takes the base station and the target terminal as examples to introduce the solution according to the embodiments of the disclosure. It can be understood that, in order to realize the above functions, the base station and the target terminal include hardware structures and/or software modules corresponding to each function. In combination with the modules and algorithm steps of the examples described in the embodiments disclosed in the disclosure, the embodiments of the disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solution of the embodiments of the disclosure.

Figure 11:
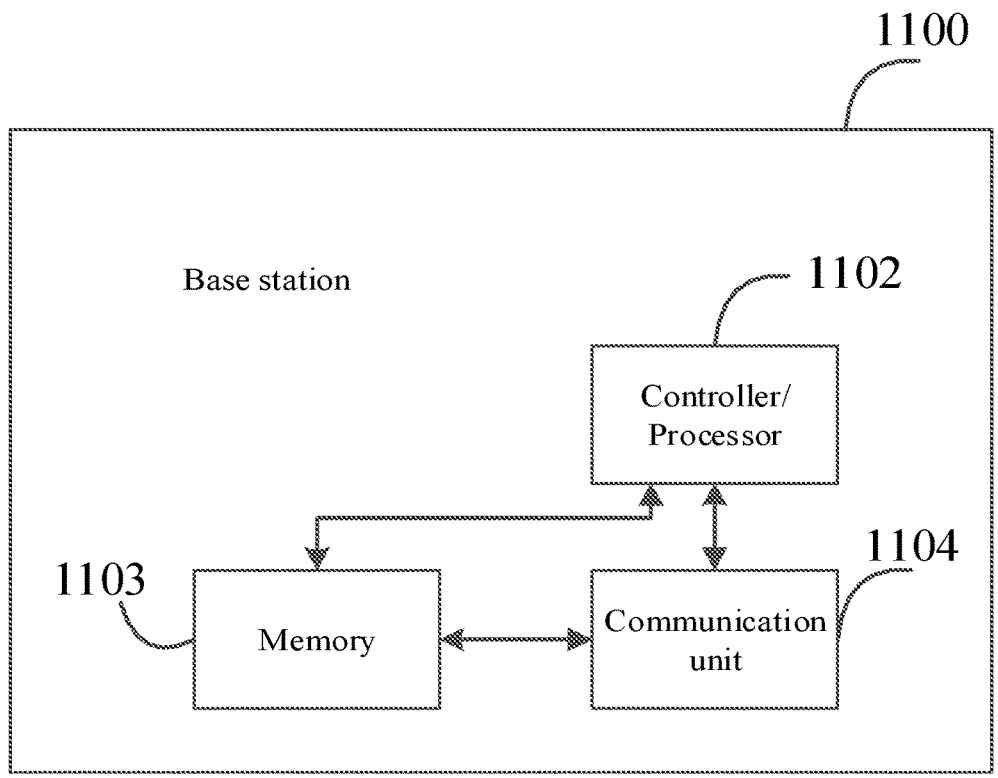
FIG. 11 is a schematic diagram of a base station according to an exemplary embodiment.

FIG. 11 is a schematic diagram of a base station according to an exemplary embodiment.

The base station 1100 includes a communication unit 1104 and a processor 1102. The processor 1102 may also be a controller, which is represented as "controller/processor 1102" in FIG. 11. The communication unit 1104 is configured to support the base station to communicate with other network devices (for example, terminals, other base stations and gateways).

Further, the base station 1100 may further include a memory 1103, and the memory 1103 is configured to store program codes and data of the base station 1100.

It is understandable that FIG. 11 only shows a simplified design of the base station 1100. In practical applications, the base station 1100 may include any number of processors, controllers, memories and communication units, and all base stations that can implement the embodiments of the disclosure are within the protection scope of the embodiments of the disclosure.

Figure 12:
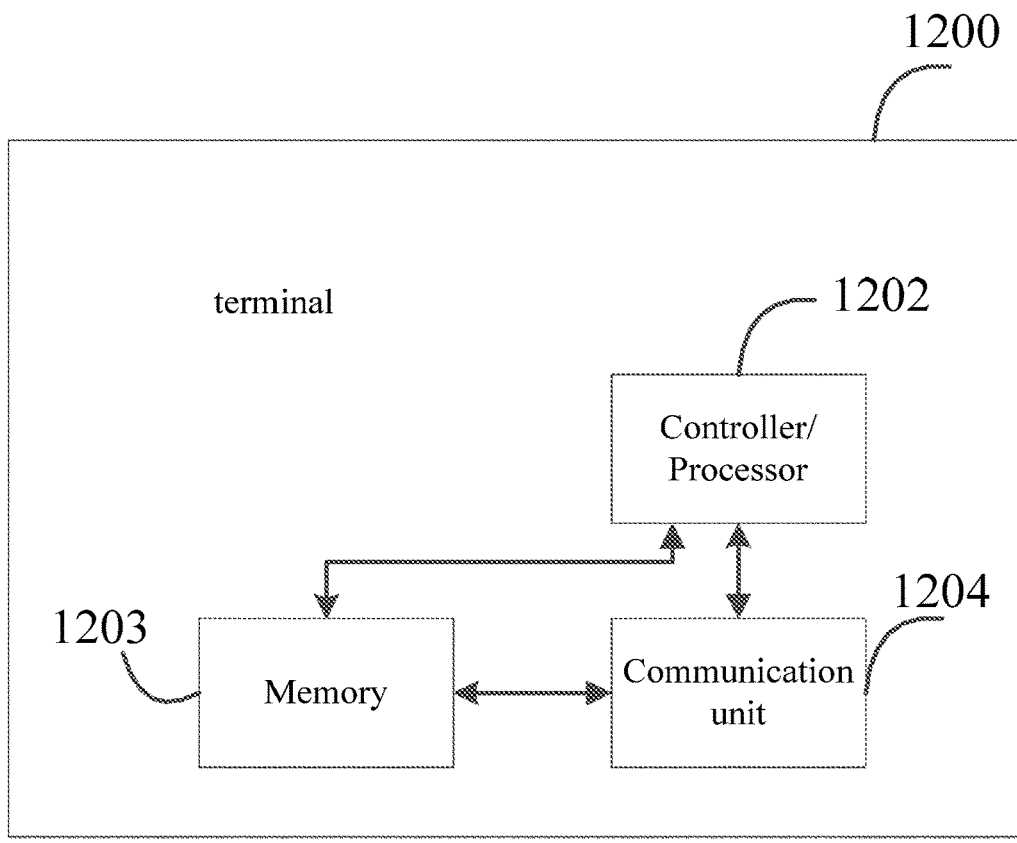
FIG. 12 is a schematic diagram of a terminal according to an exemplary embodiment.

FIG. 12 is a schematic diagram of a terminal according to an exemplary embodiment.

The terminal 1200 includes a communication unit 1204 and a processor 1202. The processor 1202 may also be a controller, which is represented as "controller/processor 1202" in FIG. 12. The communication unit 1204 is configured to support the terminal to communicate with other network devices (for example, terminals, other base stations and gateways).

Further, the terminal 1200 may further include a memory 1203, and the memory 1203 is configured to store program codes and data of the terminal 1200.

It is understandable that FIG. 12 only shows a simplified design of the terminal 1200. In practical applications, the terminal 1200 may include any number of processors, controllers, memories and communication units, and all terminals that can implement the embodiments of the disclosure are within the protection scope of the embodiments of the disclosure.

Those skilled in the art should be aware that, in one or more of the foregoing examples, the functions described in the embodiments of the disclosure may be implemented by hardware, software, firmware or any combination thereof. When implemented by software, these functions can be stored in a computer-readable medium or transmitted as one or more instructions or codes on the computer-readable medium. The computer-readable medium includes a computer storage medium and a communication medium, where the communication medium includes any medium that facilitates the transfer of a computer program from one place to another. The storage medium may be any available medium that can be accessed by a general-purpose or special-purpose computer.

The embodiments of the disclosure also provide a computer storage medium for storing computer software instructions used by the above base station, which includes a program designed to execute the method for HARQ feedback.

The embodiments of the disclosure also provide a computer storage medium for storing computer software instructions used by the above terminal, which includes a program designed to execute the method for HARQ feedback.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for hybrid automatic repeat request (HARQ) feedback, performed by a base station, comprising:

returning a second random access message Msg.B to at least one terminal after receiving a first random access message Msg.A sent by each of the at least one terminal, wherein the Msg.B is configured to indicate a HARQ feedback resource of each HARQ feedback terminal in the at least one terminal, the Msg.B comprises physical uplink control channel (PUCCH) parameters of respective HARQ feedback terminals, and the HARQ feedback resources of respective HARQ feedback terminals are different; and receiving a HARQ feedback sent by each HARQ feedback terminal for the Msg.B on the HARQ feedback resource of each HARQ feedback terminal;

wherein the PUCCH parameters comprise a time parameter k and a PUCCH resource indicator $\Delta_{PRI}$; a time point of sending the HARQ feedback is calculated based on the time parameter k, and a serial number of PUCCH resource for sending the HARQ feedback in a PUCCH resource set is calculated based on the PUCCH resource indicator $\Delta$PRIS and the PUCCH resource set is a candidate PUCCH resource set configured by a high signaling.

2. The method according to claim 1, wherein
the PUCCH parameters of respective HARQ feedback terminals comprise a time parameter k of each HARQ feedback terminal, and the PUCCH resource indicator $\Delta_{PRI}$ of each HARQ feedback terminal.

3. The method according to claim 2, wherein
the time parameter k of each HARQ feedback terminal and the PUCCH resource indicator $\Delta_{PRI}$ of each HARQ feedback terminal are carried in proprietary information of each HARQ feedback terminal, wherein the proprietary information of each HARQ feedback terminal is carried in a PDSCH of the Msg.B.

4. The method according to claim 1, before receiving the HARQ feedback sent by each HARQ feedback terminal for the Msg.B on the HARQ feedback resource of each HARQ feedback terminal, comprising:

obtaining PUCCH resource offset information of each HARQ feedback terminal based on offset configuration information, wherein the PUCCH resource offset information is configured to indicate an offset of the PUCCH resource for sending the HARQ feedback relative to a reference PUCCH resource, the reference PUCCH resource is a PUCCH resource calculated based on a PUCCH resource indicator $\Delta_{PRI}$; and determining the HARQ feedback resource of each HARQ feedback terminal based on the PUCCH resource offset information of each HARQ feedback terminal.

5. The method according to claim 4, wherein the offset configuration information comprises PUCCH resource offset information of each random access preamble sequence, and obtaining the PUCCH resource offset information of each HARQ feedback terminal based on the offset configuration information comprises:

obtaining the PUCCH resource offset information of each HARQ feedback terminal by querying the offset configuration information based on a preamble sequence included in the Msg.A sent by each HARQ feedback terminal.

6. The method according to claim 4, wherein the Msg.B comprises respective proprietary information of the at least one terminal, and the offset configuration information comprises a PUCCH resource offset information corresponding to a location where the proprietary information is in the Msg.B; and obtaining the PUCCH resource offset information of each HARQ feedback terminal based on the offset configuration information comprises:

obtaining the PUCCH resource offset information of each HARQ feedback terminal by querying the offset configuration information based on a location of the proprietary information of each HARQ feedback terminal in the Msg.B.

7. A method for hybrid automatic repeat request (HARQ) feedback, performed by a target terminal, comprising:

sending a first random access message Msg.A to a base station;

receiving a second random access message Msg.B returned by the base station, wherein the Msg.B is configured to indicate a HARQ feedback resource of each HARQ feedback terminal in at least one terminal, the Msg.B comprises physical uplink control channel (PUCCH) parameters of respective HARQ feedback terminals, and the HARQ feedback resources of respective HARQ feedback terminals are different; wherein the PUCCH parameters comprise a time parameter k and a PUCCH resource indicator $\Delta_{PRI}$; a time point of sending the HARQ feedback is calculated based on the time parameter k, and a serial number of PUCCH resource for sending the HARQ feedback in a PUCCH resource set is calculated based on the PUCCH resource indicator $\Delta_{PRI}$; and the PUCCH resource set is a candidate PUCCH resource set configured by a high signaling; and sending a HARQ feedback to the base station in response to that the target terminal is any one of the respective HARQ feedback terminals.

8. The method according to claim 7, wherein
the PUCCH parameters of respective HARQ feedback terminals comprise a time parameter k of each HARQ feedback terminal, and the PUCCH resource indicator $\Delta_{PRI}$ of each HARQ feedback terminal.

9. The method according to claim 8, wherein
the time parameter k of each HARQ feedback terminal and the PUCCH resource indicator $\Delta_{PRI}$ of each HARQ feedback terminal are carried in the proprietary information of each HARQ feedback terminal, wherein the proprietary information of each HARQ feedback terminal is carried in a PDSCH of the Msg.B.

10. The method according to claim 7, before sending the HARQ feedback to the base station on the HARQ feedback resource of the target terminal, further comprising:

obtaining PUCCH resource offset information of the target terminal based on offset configuration information, wherein the PUCCH resource offset information is configured to indicate an offset of the PUCCH resource for sending the HARQ feedback relative to a reference PUCCH resource, and the reference PUCCH resource is a PUCCH resource calculated based on a PUCCH resource indicator $\Delta_{PRI}$; and determining the HARQ feedback resource of the target terminal based on the PUCCH resource offset information of the target terminal.

11. The method according to claim 10, wherein the offset configuration information comprises the PUCCH resource offset information of each random access preamble sequence; and obtaining the PUCCH resource offset information of the target terminal based on the offset configuration information comprises:
  obtaining the PUCCH resource offset information of the target terminal by querying the offset configuration information based on the preamble sequence in the Msg.A sent by the target terminal.

12. The method according to claim 10, wherein the Msg.B comprises proprietary information of each of the at least one terminal, and the offset configuration information comprises the PUCCH resource offset information corresponding to a location of the proprietary information in the Msg.B; and
  obtaining the PUCCH resource offset information of the target terminal based on the offset configuration information, comprises:
    obtaining the PUCCH resource offset information of the target terminal by querying the offset configuration information based on the location of the proprietary information of the target terminal in the Msg.B.

13. An apparatus for hybrid automatic repeat request (HARQ) feedback, performed by a base station, comprising:
  a processor;
  a memory configured to store instructions executable by the processor; wherein,
  the processor is configured to implement the method according to claim 1 by executing the instructions stored in the memory.

14. An apparatus for hybrid automatic repeat request (HARQ) feedback, performed by a target terminal, comprising:
  a processor;
  a memory configured to store instructions executable by the processor; wherein,
  the processor is configured to:
  send a first random access message Msg.A to a base station;
  receive a second random access message Msg.B returned by the base station, wherein the Msg.B is configured to indicate a HARQ feedback resource of each HARQ feedback terminal in at least one terminal, the Msg.B comprises physical uplink control channel (PUCCH) parameters of respective HARQ feedback terminals, and the HARQ feedback resources of respective HARQ feedback terminals are different; wherein the PUCCH parameters comprise a time parameter k and a PUCCH resource indicator $\Delta_{PRI}$; a time point of sending the HARQ feedback is calculated based on the time parameter k, and a serial number of PUCCH resource for sending the HARQ feedback in a PUCCH resource set is calculated based on the PUCCH resource indicator $\Delta_{PRI}$; and the PUCCH resource set is a candidate PUCCH resource set configured by a high signaling; and
  send a HARQ feedback to the base station in response to that the target terminal is any one of the respective HARQ feedback terminals.

\* \* \* \* \*